(12) United States Patent
Konttori et al.

(10) Patent No.: US 12,401,779 B1
(45) Date of Patent: Aug. 26, 2025

(54) CALIBRATING OPTICAL COMBINER USING STRUCTURED LIGHT

(71) Applicant: Distance Technologies Oy, Helsinki (FI)

(72) Inventors: Urho Konttori, Helsinki (FI); Thomas Carlsson, Vantaa (FI); Mikko Strandborg, Hangonkylä (FI)

(73) Assignee: Distance Technologies Oy, Helsinki (FI)

( * ) Notice: Subject to any disclaimer, the term of this patent is extended or adjusted under 35 U.S.C. 154(b) by 0 days.

(21) Appl. No.: 18/781,039

(22) Filed: Jul. 23, 2024

Related U.S. Application Data

(63) Continuation-in-part of application No. 18/630,182, filed on Apr. 9, 2024.

(51) Int. Cl.
*H04N 13/117* (2018.01)
*H04N 13/302* (2018.01)
*H04N 13/327* (2018.01)
*H04N 13/398* (2018.01)
*H04N 13/00* (2018.01)

(52) U.S. Cl.
CPC ......... *H04N 13/327* (2018.05); *H04N 13/117* (2018.05); *H04N 13/302* (2018.05); *H04N 13/398* (2018.05); *H04N 2013/0096* (2013.01)

(58) Field of Classification Search
CPC .............. H04N 13/327; H04N 13/117; H04N 13/302; H04N 13/398; H04N 2013/0096
See application file for complete search history.

(56) References Cited

U.S. PATENT DOCUMENTS

| 6,714,665 B1 * | 3/2004 | Hanna | G07C 9/37 |
| | | | 382/209 |
| 12,035,057 B1 * | 7/2024 | Park | G02B 21/367 |
| 12,099,357 B1 * | 9/2024 | Ebrahimi Afrouzi | |
| | | | G05D 1/0214 |
| 12,127,859 B2 * | 10/2024 | Guegel-Wild | A61B 5/742 |
| 2002/0015934 A1 * | 2/2002 | Rubbert | A61C 7/146 |
| | | | 433/29 |

(Continued)

FOREIGN PATENT DOCUMENTS

| CN | 103314382 | * | 6/2011 |
| WO | WO 0223124 | * | 9/2001 |
| WO | WO 2016128112 | * | 1/2016 |

OTHER PUBLICATIONS

Bender, William translation of CN 103314382 Jun. 23, 2011 (Year: 2011).*

*Primary Examiner* — Zaihan Jiang
(74) *Attorney, Agent, or Firm* — ZIEGLER IP LAW GROUP, LLC.

(57) ABSTRACT

Disclosed is a system implemented in an enclosed space. The system includes light source(s); tracking camera(s); an optical combiner arranged on an optical path of a light field display unit and on an optical path of a real-world light field of a real-world environment; and processor(s) configured to: control the tracking camera(s) to capture image(s) of the enclosed space, whilst controlling the light source(s) to project light pattern(s) onto a semi-reflective surface of the optical combiner; detect, in the image(s), a reflection of at least a part of the light pattern(s) off surface(s) in the enclosed space, and determine a shape of said reflection; and determine a curvature of the optical combiner, based on shapes of at least said part of the light pattern(s) and the reflection.

12 Claims, 7 Drawing Sheets

(56) References Cited

U.S. PATENT DOCUMENTS

| | | | |
|---|---|---|---|
| 2005/0057737 A1* | 3/2005 | Tsuji | G03F 7/702 |
| | | | 355/71 |
| 2012/0133920 A1* | 5/2012 | Skunes | H04N 7/188 |
| | | | 356/23 |
| 2019/0138094 A1* | 5/2019 | Miettinen | G02B 27/0093 |
| 2023/0230387 A1* | 7/2023 | Herman | G06V 20/56 |
| | | | 701/25 |
| 2023/0296432 A1* | 9/2023 | Kowarz | G01J 1/0425 |
| 2024/0142225 A1* | 5/2024 | Ji | G01B 11/2518 |
| 2024/0164624 A1* | 5/2024 | Shalev | A61C 9/0053 |
| 2024/0310851 A1* | 9/2024 | Ebrahimi Afrouzi | G01S 17/87 |

* cited by examiner

CALIBRATING OPTICAL COMBINER USING STRUCTURED LIGHT

CROSS-REFERENCE TO RELATED APPLICATIONS

This application is a continuation-in-part of U.S. patent application Ser. No. 18/630,182, titled "DISPLAY CURVATURE COMPENSATION BASED ON RELATIVE LOCATION OF USER" and filed on Apr. 9, 2024, which is incorporated herein by reference.

TECHNICAL FIELD

The present disclosure relates to systems for calibrating optical combiner using structured light. The present disclosure also relates to methods for calibrating optical combiner using structured light.

BACKGROUND

Glasses-free augmented-reality (AR) systems (for example, such as automotive head-up displays (HUDs) or similar) have emerged as significant advancement for presenting visual information to users without diverting their attention from their primary tasks, for example, such as driving a vehicle. Some HUDs utilise an optical combiner (for example, in a form of a windshield of the vehicle) which typically reflects a corresponding part of light emanating from a display towards a given eye of a user, in order to display the visual information to the user. Furthermore, said HUDs are typically designed for single-user scenarios, primarily due to their limited fields of view, and consequently, have small eye boxes (namely, viewing areas). In such a case, either a curvature of the optical combiner does not pose any significant issues, or even where said curvature may impact an overall image quality, static and pre-defined curvature compensation techniques are employed during AR rendering.

However, when a field-of-view of the display and a viewing area increase in an HUD, the curvature of the optical combiner becomes highly significant, as it directly influences an accuracy of AR rendering. Further, a long-term reliability of the optical combiner faces significant challenges in real-world applications, particularly, in dynamic environments such as moving vehicles. Over an operational lifetime of a vehicle, various types of stresses (for example, such as thermal expansion and contraction, tensile stress-induced deformations, mechanical wear and tear, and the like) are exerted on the vehicle (particularly, on the optical combiner). This results in subtle yet consequential alterations in at least one of: a position, an orientation, the curvature, of the optical combiner. Some of these alterations also occur when the windshield of the vehicle (namely, the optical combiner) needs to be replaced or repaired. Thus, in such a case, employment of said static and pre-defined curvature compensation techniques is inefficient and unreliable. Resultantly, spatial reconstruction of 3D scenes and objects is compromised (namely, becomes inaccurate), and an overall viewing experience of the user is adversely affected, and becomes unrealistic and non-immersive.

Therefore, in light of the foregoing discussion, there exists a need to overcome the aforementioned drawbacks.

SUMMARY

The present disclosure seeks to provide a system and a method which facilitate a simple, yet accurate and reliable way to calibrate an optical combiner by way of determining a curvature of the optical combiner based on a shape of light pattern(s) and a shape of a reflection of said light pattern(s). The aim of the present disclosure is achieved by a system and a method which incorporate calibration of an optical combiner using structured light, as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

BRIEF DESCRIPTION OF THE DRAWINGS

FIGS. 3F, 3G, and 3H illustrate different exemplary images captured whilst projecting the light pattern, while

DETAILED DESCRIPTION OF EMBODIMENTS

Figure 1:
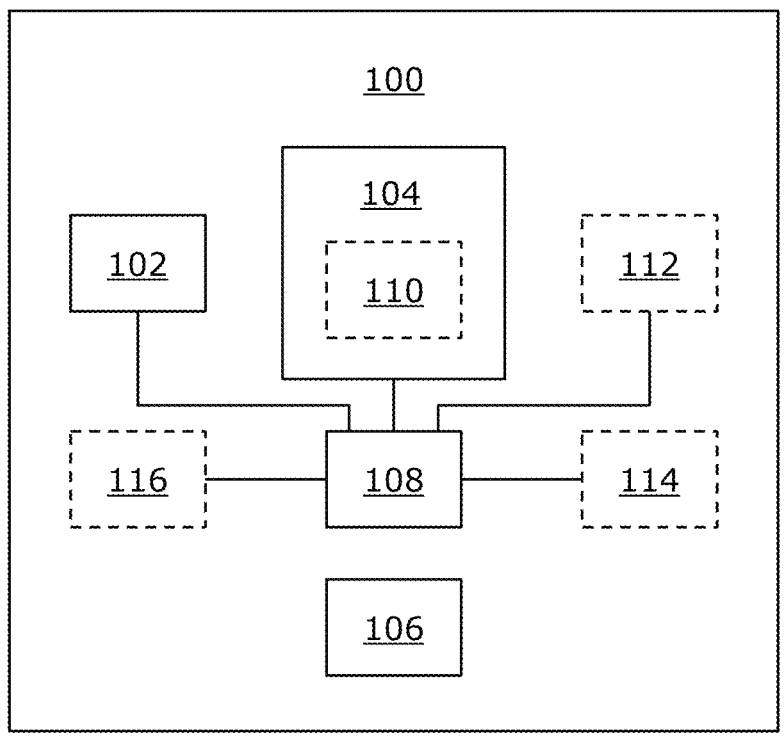
FIG. 1 illustrates a block diagram of an architecture of a system for calibrating an optical combiner using structured light, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a system implemented in an enclosed space, the system comprising:
- at least one light source;
- at least one tracking camera;
- an optical combiner arranged on an optical path of a light field display unit and on an optical path of a real-world light field of a real-world environment; and at least one processor configured to:
  control the at least one tracking camera to capture at least one image of the enclosed space, whilst controlling the at least one light source to project at least one light pattern onto a semi-reflective surface of the optical combiner;
  detect, in the at least one image, a reflection of at least a part of the at least one light pattern off at least one surface in the enclosed space, and determine a shape of said reflection; and
  determine a curvature of the optical combiner, based on a shape of at least said part of the at least one light pattern and the shape of the reflection of at least said part of the at least one light pattern.

In a second aspect, an embodiment of the present disclosure provides a method implemented in an enclosed space, the method comprising:
  controlling at least one tracking camera to capture at least one image of an enclosed space, whilst controlling at least one light source to project at least one light pattern onto a semi-reflective surface of an optical combiner, wherein the optical combiner is arranged on an optical path of a light field display unit and on an optical path of a real-world light field of a real-world environment;
  detecting, in the at least one image, a reflection of at least a part of the at least one light pattern off at least one surface in the enclosed space, and determining a shape of said reflection; and
  determining a curvature of the optical combiner, based on a shape of at least said part of the at least one light pattern and the shape of the reflection of at least said part of the at least one light pattern.

The present disclosure provides the aforementioned system and the aforementioned method which facilitate a simple, yet accurate and reliable to determine the curvature of the optical combiner, in a time-efficient and computationally-efficient manner. Herein, since the shape of the at least one light pattern (for example, such as a structured light pattern) is pre-known, and the shape of said reflection is determined by the at least one processor, a distortion in the shape of said reflection with respect to the at least one light pattern could be determined, in order to determine the curvature of the optical combiner. Such a distortion in the shape of the at least one light pattern could be known, for example, by comparing the shape of the at least one light pattern and the shape of said reflection to determine a deviation (for example, such as a linear deviation and/or an angular deviation) of a given point in said reflection with respect to a corresponding point in the at least one light pattern, wherein said deviation is caused due to the curvature of the optical combiner. In this way, the at least one processor may utilise the deviation determined for each point in said reflection, to determine a mathematical model or a mathematical function describing the curvature of the optical combiner. Advantageously, when the at least one processor has a knowledge pertaining to the curvature of the optical combiner, any geometrical aberrations arising due to the curvature of the optical combiner are easily corrected (namely, compensated) in a dynamic manner, as compared to the prior art where static and pre-defined curvature compensation techniques are employed. As an example, such a curvature compensation may be required when generating an input (such as in a form of a light field image) to be employed at the light field display unit, for producing a synthetic light field that presents virtual content. This may potentially enhance an overall viewing experience of a given user, for example, in terms of realism and immersiveness, when the virtual content is shown to the given user. The system and the method potentially enable in determining the curvature of the optical combiner even in real-world scenarios where the enclosed space is being used, and where any part of the enclosed space may be exposed to wear and tear (for example, such as due to a mechanical stress, a thermal stress, and the like) over a period of time. The system and the method are susceptible to be employed where head-up displays (HUDs) have relatively large fields of view and eye boxes (namely, viewing areas), without comprising an accuracy of augmented-reality (AR) rendering (namely, the virtual content). The system and the method are simple, robust, fast, reliable, and support real-time determination of the curvature of the optical combiner, and can be implemented with ease.

Notably, the at least one processor controls an overall operation of the system. The at least one processor is communicably coupled to at least the at least one light source and the at least one tracking camera, and optionally, to the light field display unit. In some implementations, the at least one processor is implemented as a processor of the light field display unit. In other implementations, the at least one processor is implemented as a processor of a computing device. Examples of the computing device include, but are not limited to, a laptop, a tablet, a phablet, and a smartphone. In yet other implementations, the at least one processor is implemented as a cloud server (namely, a remote server) that provides a cloud computing service.

Throughout the present disclosure, the term "enclosed space" refers to a physical space that is at least partially surrounded by boundaries or coverings. In other words, the enclosed space could either be a partially enclosed space or a fully enclosed space. Optionally, the enclosed space is in a form of a cabin of a vehicle. Examples of the vehicle include, but are not limited to, an aircraft, a car, a truck, a ship. The car could be a convertible car or a hardtop car. The vehicle could also be a semi-open vehicle (such as a boat). It will be appreciated that the enclosed space may also be located in a museum, a monument, an entertainment park, or the like. The enclosed space may, for example, be a specialised space for interactive activities or similar. It will also be appreciated that the aforementioned system is susceptible to be utilised inside an enclosed space that is rigid. Herein, the term "rigid" refers to only a structural rigidity of the enclosed space. The enclosed space could be movable/portable. It is to be understood that when the enclosed space is the cabin of the vehicle, the given user sitting on a seat of the vehicle could be a driver of the vehicle or a passenger in the vehicle.

Optionally, the at least one tracking camera is utilised for capturing at least the at least one image of the enclosed space. In this regard, the at least one tracking camera is arranged to face (an interior of) the enclosed space. It is to be understood that for capturing the at least one image, at least one region of the enclosed space would lie in a field-of-view of the at least one tracking camera. In this regard, the at least one image is captured from a perspective of a given viewing position and a given viewing angle of the at least one tracking camera. Optionally, the at least one tracking camera comprises at least one of: at least one visible-light camera, at least one IR camera. In this regard, the at least one image could be at least one of: a visible-light image, an IR image. Examples of a given visible-light camera include, but are not limited to, a Red-Green-Blue (RGB) camera, a Red-Green-Blue-Alpha (RGB-A) camera, a Red-Green-Blue-Depth (RGB-D) camera, a Red-Green-Blue-White (RGBW) camera, a Red-Yellow-Yellow-Blue (RYYB) camera, a Red-Green-Green-Blue (RGGB) camera, a Red-Clear-Clear-Blue (RCCB) camera, a Red-Green-Blue-Infrared (RGB-IR) camera, and a monochrome camera. Optionally, the at least one tracking camera further comprises at least one depth camera, in addition to the at least one of: the at least one visible-light camera, the at least one IR camera. An image capturing operation is well-known in the art.

Throughout the present disclosure, the term "light source" refers to an equipment that is capable of projecting (namely, emitting) the at least one light pattern. The at least one light source may be an infrared (IR) light source or a visible-light light source. Optionally, a given light source comprises a plurality of light-emitting elements, wherein a given light-emitting element is any one of: a light-emitting diode (LED), a projector, a display, a laser. The laser may be a vertical-cavity surface-emitting laser (VCSEL), an edge-emitting laser (EEL), or the like. It will be appreciated that the at least one light source is arranged to face the optical combiner (for projecting the at least one light pattern onto the semi-reflective surface of the optical combiner). However, an orientation and/or a position of the at least one light source is optionally controllable by the at least one processor.

In some implementations, the light pattern is a structured-light pattern. Such a structured-light pattern could be a binary-coded structured-light pattern, a grey-coded structured-light pattern, a colour-coded structured-light pattern, or similar. In an example, the structured-light pattern may be in the form of a single crosshair-like light pattern comprising two perpendicular lines of light, or a grid of crosshair-like light patterns comprising multiple horizontal lines of light and multiple vertical lines of light that are perpendicular to each other. This has been also illustrated in conjunction with FIGS. 3C and 3D, for sake of better understanding and clarity. The technical benefit of employing the structured-light pattern is that it facilitates in accurately determining the curvature of the optical combiner with a minimal projection time (namely, a scanning time) as no marker shape deducing is required. Moreover, the structured-light pattern may also allow to accurately detect a change in the curvature of the optical combiner.

In other implementations, the at least one light pattern comprises a plurality of light spots. In this regard, a density of the plurality of light spots (namely, light dots) may vary spatially across the at least one light pattern. Greater the density and the complexity of the at least one light pattern, higher is the accuracy in determining the curvature of the optical combiner (since a light pattern having higher complexity may facilitate in ascertaining deformations in the shape of said reflection comprehensively), and vice versa. Optionally, a shape of the at least one light pattern is one of: circular, elliptical, polygonal, a freeform shape. Moreover, the shape of the light spots could be one of: circular, elliptical, polygonal, a freeform shape. The at least one light pattern comprising a single light spot could be a simplest type of a light pattern.

Throughout the present disclosure, the term "light field display unit" refers to a specialised equipment that is capable of producing a synthetic light field. Optionally, the light field display unit is utilised to employ an input (generated by the at least one processor) to produce the synthetic light field at a given resolution. Information pertaining to said input for producing the synthetic light field will be discussed later in detail. It will be appreciated that different types of light field display units can be implemented. For example, the light field display unit can be any one of: a hogel-based light field display unit, a lenticular array-based light field display unit, a parallax barrier-based light field display unit, a hologram-projector-based light field display unit, a scanning-laser-based light field display unit, a cathode ray tube (CRT)-like light field display unit. All the aforementioned forms of light field display units are well-known in the art.

Throughout the present disclosure, the term "optical combiner" refers to a specialised equipment that is capable of at least reflecting the at least one light pattern projected by the at least one light source onto the semi-reflective surface of the optical combiner. Optionally, the optical combiner is further capable of reflecting a corresponding part of the synthetic light field towards a given eye of a given user, whilst optically combining said part of the synthetic light field with the real-world light field, wherein the given user is present inside the enclosed space (as discussed later in detail). Optionally, the optical combiner is implemented by way of at least one of: a semi-transparent mirror, a semi-transparent film, a semi-transparent flexible membrane, a beam splitter, a lens, a mirror, a prism, an optical waveguide, a polarizer. Optical combiners are well-known in the art. Optionally, a tilt angle of the optical combiner with respect to an image plane of the light field display unit lies in a range of 10 degrees and 75 degrees. It will be appreciated that when a plurality of users are present inside the enclosed space, some users may directly face the optical combiner (namely, in almost a straight manner), while remaining users may face the optical combiner in a diagonal manner (namely, obliquely or sideways). In an example implementation, when the enclosed space is in the form of a cabin of a vehicle, and when a windshield of the vehicle is utilised as the optical combiner, the optical combiner would have a curved surface (namely, a curvature).

Throughout the present disclosure, the term "real-world light field" refers to a light field emanating from the real-world environment in which the enclosed space is present. Further, the term "synthetic light field" refers to a light field that is produced (namely, generated) synthetically by the light field display unit. It will be appreciated that in case of the real-world light field, light from, for example, a natural light source (such as the Sun) and/or an artificial light source (such as a lamp, a bulb, a tube-light, or similar), are reflected off real-world objects (or their portions) to be incident towards eyes of the given user present inside the enclosed space. In this way, visual information (for example, such as colour information, depth information, and the like) pertaining to said real-world objects is typically perceived by said eyes. On the other hand, in case of the synthetic light field, light emanating from the light field display unit, upon reflecting off the optical combiner, is incident on said eyes of the given user. In this way, visual information pertaining to virtual content (presented by the synthetic light field) can be perceived by said eyes of the given user.

It will be appreciated that when the at least one light pattern is projected onto the semi-reflective surface of the optical combiner, the at least one light pattern is incident upon the at least one surface in the enclosed space after being reflected by the semi-reflective surface of the optical combiner. The at least one surface may pertain to at least one object present in the enclosed space. For example, when the enclosed space is the cabin of the vehicle, the at least one object may be a headrest of a seat of the vehicle. Thus, the at least one image not only represents a visual representation of the reflection of at least said part of the at least one light pattern off the at least one surface in the enclosed space, but may also represent a visual representation of the at least one object present in the enclosed space. The term "visual representation" encompasses colour information represented in a given image, and additionally optionally other attributes (for example, such as depth information, illuminance information, transparency information (namely, alpha values), and the like) associated with the given image.

Upon capturing the at least one image, the reflection of at least said part of the at least one light pattern is detected in the at least one image, for example, based on at least one of: a shape of at least said part of the at least one light pattern, a wavelength (for example, such as a colour) of the at least one light pattern. Information pertaining to the shape and the wavelength of the at least one light pattern is pre-known to the at least one processor. Optionally, in this regard, the at least one processor is configured to employ at least one image processing technique for detecting said reflection in the at least one image. In an example, said reflection in the at least one image can be detected, by employing a colour filtering technique to identify those pixels in the at least one image that matches with the colour of the at least one light pattern. All such image processing techniques are well-known in the art. In addition to this, the shape of said reflection can be determined, for example, by employing a contour-detection technique and/or a line-detection algorithm. Moreover, since the shape of at least said part of the at least one light pattern is pre-known, a thresholding technique and/or an edge-detection technique could also be employed to easily distinguish said reflection from other object(s) represented in the at least one image.

It will be appreciated that when the optical combiner has a flat surface (namely, no curvature), and when the at least one surface (or at least a part of the at least one surface) is assumed to be flat or near-flat, the shape of at least said part of the at least one light pattern and the shape of said reflection would be significantly similar, i.e., there would be a zero or near-zero distortion in the shape of said reflection with respect to the shape of at least said part of the at least one light pattern. This is because when the optical combiner has the flat surface, said reflection would likely maintain the (original) shape of the at least one light pattern. It will be appreciated that, for cases where the optical combiner has the flat surface, since said reflection of the at least one light pattern is captured by the at least one tracking camera, the at least one image captured by the at least one tracking camera actually represents a mirror-image of the at least one light pattern being reflected-off from an interior geometry of the enclosed space (namely, the at least one surface in the enclosed space). When the optical combiner has the flat surface, and the at least one tracking camera has a similar field-of-view and other optical properties as that of the at least one light source, the at least one tracking camera may likely be arranged near the optical combiner, such as at a location where the at least one light pattern is projected onto the semi-reflective surface of the optical combiner. In other words, both the at least one light source and the at least one tracking camera have a same nearest point on an imaginary plane along the semi-reflective surface of the optical combiner, and both the at least one light source and the at least one tracking camera have a same distance from said imaginary plane, but in opposite directions. In such a case, the at least one image captured by the at least one tracking camera actually represents a mirror-image of the at least one (original) light pattern that is undistorted (regardless of a shape of the at least one surface in the enclosed space). Hereinabove, the at least one light source may be implemented as a projector (i.e., when light emission from the at least one light source originates from a single point or a relatively-small area). Furthermore, in a real-world scenario, in the enclosed space (for example, a cabin of a vehicle), the at least one tracking camera may not be arranged near the optical combiner as discussed hereinabove. In such a scenario, the at least one image (captured by the at least one tracking camera) is optionally reprojected, based on a difference in a location of the at least one light source and a location of the at least one tracking camera source. Alternatively, said reprojection is optionally performed based on a position said reflection and then taking into account a mirroring-effect. Upon such a reprojection, the shape of the curvature can be deduced based on based on the distortion in the shape of said reflection with respect to the shape of at least said part of the at least one light pattern. However, typically, when the optical combiner has a curved surface (i.e., when the windshield of the vehicle is utilised as the optical combiner),, the shape of at least said part of the at least one light pattern and the shape of said reflection would be significantly different. This is because the curvature of the optical combiner potentially causes light emitting from the at least one light source to reflect unevenly off the curved surface of the optical combiner, thus there would be a distortion in the shape of said reflection with respect to the shape of at least said part of the at least one light pattern. It will be appreciated that an orientation and/or a shape of the at least one surface in the enclosed space may also likely affect the shape of said reflection, in addition to the curvature of the optical combiner. This is likely because the at least one light pattern is projected onto the at least one surface only, and in real-world scenarios the at least one surface (or at least said part of the at least one surface) are not typically flat.

Since the shape of the at least one light pattern is pre-known, and the shape of said reflection is already accurately determined by the at least one processor, a distortion in the shape of said reflection with respect to the at least one light pattern could be determined, in order to determine the curvature of the optical combiner. Such a distortion in the shape could be known, for example, by comparing the shape of the at least one light pattern and the shape of said reflection to determine a deviation (for example, such as a linear deviation and/or an angular deviation) of a given point in said reflection with respect to a corresponding point in the at least one light pattern, wherein said deviation is caused due to the curvature of the optical combiner. In this regard, the linear deviation could be determined, for example, by comparing coordinates of the given point and the corresponding point. The angular deviation could be determined, for example, by comparing an angle formed between a reference point and the given point and an angle formed between said reference point and the corresponding point. Said angles could be measured with respect to a fixed axis, such as a horizontal axis. Thus, the at least one processor may utilise the deviation determined for each point in said reflection, to determine a mathematical model or a mathematical function describing the curvature of the optical combiner. As an example, the at least one processor may employ at least one regression technique or at least one curve-fitting algorithm to map deviations into the mathematical model, which accurately represents a surface geometry of the optical combiner. Beneficially, when the at least one processor has a knowledge pertaining to the curvature of the optical combiner (that is determined in the aforesaid manner), any geometrical aberrations arising due to the curvature of the optical combiner could be easily corrected (namely, compensated) in a dynamic manner, for example, when generating the input for producing the synthetic light field presenting virtual content (as discussed later in detail). This may potentially enhance an overall viewing experience of the given user, for example, in terms of realism and immersiveness, when the virtual content is shown to the given user by way of producing the synthetic light field.

Optionally, the at least one tracking camera comprises at least one depth camera, wherein the at least one processor is configured to:
  utilise the at least one depth camera to generate a depth image of the enclosed space;
  determine relative positions of different pattern features of the reflection with respect to the at least one tracking camera, based on optical depths of different portions of the at least one surface in the depth image; and
  determine the curvature of the optical combiner, further based on the relative positions of the different pattern features of the reflection.

In this regard, the term "depth image" refers to an image that is indicative of optical depths of the at least one surface in the enclosed space from a perspective of the at least one depth camera which captured the depth image. Optionally, the depth image is in the form of a depth map. The term "depth map" refers to a data structure comprising information pertaining to the optical depths the different portions of the at least one surface in the depth image. The depth map could be an image comprising a plurality of pixels, wherein a pixel value of each pixel indicates an optical depth of its corresponding 3D point within the enclosed space. Examples of the at least one depth camera include, but are not limited to, a Time-of-Flight (ToF) camera, a light detection and ranging (LiDAR) camera, a Red-Green-Blue-Depth (RGB-D) camera, a laser rangefinder, a stereo camera, a plenoptic camera, a ranging camera, a Sound Navigation and Ranging (SONAR) camera. In some implementations, the at least one depth camera is implemented as a pair of visible-light cameras. In this regard, images captured by the pair of visible-light cameras are obtained as stereo pairs of visible-light images of the enclosed space. Optionally, in such a case, the at least one processor is configured to generate the depth image of the enclosed space by using stereo disparity between a given stereo pair of visible-light images.

The term "pattern feature" refers to a feature pertaining to the reflection of the at least one light pattern. Such a feature could, for example, be a corner, an edge, a point, or similar. The pattern features can be in various different forms, depending on a type of the at least one light pattern. As an example, when a given light pattern is a single crosshair-like light pattern, a given pattern feature could be considered to be a point representing a junction of two perpendicular lines of light of the single crosshair-like light pattern. In this way, a grid of crosshair-like light patterns would have several different junctions which could be the different pattern features of the reflection. As another example, when a given light pattern is a square-shape light pattern, the different pattern features could be corners of the square-shape light pattern. As yet another example, when a given light pattern comprises a plurality of light spots, different light spots could be considered as the different pattern features. The different pattern features of the reflection correspond to the different portions of the at least one surface.

It is to be noted the at least one surface (or at least a portion of the at least one surface) off which at least said part of the at least one light pattern is reflected to generate said reflection may not necessarily be flat, and may have a curvature. Due to this, the different pattern features of the reflection would likely align themselves according to curvatures of the different portions of the at least one surface. Thus, it can be inferred that a distortion (namely, deformation) in the shape of said reflection would not just only due to the curvature of the optical combiner, but may also be due to the curvature of the at least one surface. In this regard, the curvature of the optical combiner that is determined by assuming that the at least one surface is always flat, may likely be inaccurate. In order to mitigate this potential problem, the relative positions of the different pattern features are taken into account (namely, the curvature of the at least one surface is also considered), when determining the curvature of the optical combiner. Advantageously, in this way, the curvature of the optical combiner is highly accurately and precisely determined. As an example, the at least one processor may utilise said relative positions when determining the mathematical model or the mathematical function describing the curvature of the optical combiner (as discussed earlier).

It will be appreciated that a given pattern feature can be extracted from the at least one image, and thus a two-dimensional (2D) position of said given pattern feature can be accurately known to the at least one processor, for example, from pixel coordinates of corresponding pixels in the at least one image. In addition to this, since the optical depths of the different portions of the at least one surface are accurately known from the depth image, a curvature of the at least one surface could be easily determined and utilised when determining the curvature of the optical combiner. Further, since the different pattern features of the reflection correspond to the different portions of the at least one surface, optical depths of the different pattern features would correspond to the optical depths of the different portions of the at least one surface. By utilising the depth image, a depth coordinate for each pixel along a depth axis (namely, a Z-axis) of the at least one tracking camera could also be easily known to the at least one processor. Therefore, by utilising said pixel coordinates and said depth coordinate, a relative position of the given pattern feature can be accurately and conveniently determined accordingly. Said relative position could be a 3D position of the given pattern feature in a common coordinate space.

Optionally, the at least one processor is configured to:
  control the at least one tracking camera to capture at least one other image of the enclosed space, whilst controlling an orientation of the at least one light source to project the at least one light pattern onto the at least one surface in the enclosed space;
  detect, in the at least one other image, another reflection of at least a part of the at least one light pattern off the at least one surface in the enclosed space, and determine a shape of the another reflection; and
  determine the curvature of the optical combiner, further based on the shape of the another reflection.

In this regard, the orientation of the at least one light source is controlled (namely, adjusted or changed) in a manner that the at least one light source would face the at least one surface in the enclosed space, for projecting the at least one light pattern directly onto the at least one surface. Thus, in such a case, the at least one light pattern is incident directly upon the at least one surface, i.e., without being reflected by the semi-reflective surface of the optical combiner. Optionally, the at least one processor is configured to control at least the orientation of the at least one light source by employing an actuator. The actuator may be driven by an actuation signal, for example, such as a piezoelectric force, an electromagnetic force, a mechanical torque, an electric current, or similar. A position of the at least one light source may also be controlled, in addition to its orientation. It will be appreciated that detection of the another reflection in the at least one other image and determination of the shape of the another reflection are performed by the at least one processor in a similar manner, as described earlier with respect to said reflection in the at least one image.

It will be appreciated that since the another reflection is generated when the at least one light pattern is not at all reflected by the semi-reflective surface of the optical combiner, the shape of the another reflection may highly likely remain minimally distorted (namely, minimally deformed), as compared to the shape of said reflection, because said reflection is generated when the at least one light pattern incidents upon the at least one surface after being reflected by the semi-reflective surface. Beneficially, in such a case, the shape of the another reflection could be served as a basis (namely, a reference) for comparing it with the shape of said reflection in order to ascertain a distortion in the shape of said reflection with respect to the shape of the another reflection. In this way, the curvature of the optical combiner is highly accurately and precisely determined, when said distortion in the shape of said reflection with respect to the shape of the another reflection is also taken into account. As an example, the at least one processor may utilise said distortion when determining the mathematical model or the mathematical function describing the curvature of the optical combiner (as discussed earlier). It will also be appreciated that the aforesaid step of determining the curvature of the optical combiner could be performed on-the-fly (namely, when the given user is present inside the enclosed space that is implemented as the cabin of the vehicle) and/or when the first set of reference images of the enclosed space is captured (for example, at the factory manufacturing step when no user is present in the enclosed space, as discussed earlier).

Optionally, the at least one processor is configured to:
control the at least one tracking camera to capture a first set of reference images of the enclosed space, whilst controlling the at least one light source to project the at least one light pattern onto the semi-reflective surface of the optical combiner;
extract features from the first set of reference images;
select, from amongst the features extracted from the first set of reference images, a first set of features that pertain to at least one object that has the at least one surface off which at least a part of the at least one light pattern is reflected to generate a reference reflection;
determine a first relative position of the reference reflection with respect to positions of the features of the first set;
extract features from the at least one image of the enclosed space;
select, from amongst the features extracted from the at least one image, a second set of features that pertain to the at least one object that has the at least one surface off which at least said part of the at least one light pattern is reflected to generate said reflection and that match with at least a subset of the first set of features;
determine a second relative position of said reflection with respect to positions of the features of the second set; and
determine a change in at least one of: a position, an orientation, the curvature of the optical combiner, based on a difference between the first relative position of the reference reflection and the second relative position of said reflection.

In this regard, the term "reference image" refers to an image that is captured by the at least one tracking camera in an initial condition. Such an initial condition could, for example, be when the enclosed space is freshly manufactured and the optical combiner (namely, the windshield of the vehicle) is not yet exposed to at least one of: wear and tear, a positional drift, a rotational drift, for example, such as due to a mechanical stress, a thermal stress, and the like. The positional drift (namely, a change in a position of the optical combiner) and the rotational drift (namely, a change in an orientation of the optical combiner) may occur, for example, when the optical combiner is to be replaced with a new one or to be repaired. Thus, for such an exemplary initial condition, the reference images of said first set are to be understood to be captured at a factory manufacturing step. There could also be various other initial conditions than that described hereinabove. Since a given reference image is captured in the initial condition, the given reference image can be understood to be a standard, baseline image representing initial (namely, intended) positions of features pertaining to object(s) in the enclosed space. In such a case, the given reference image would be beneficially utilised for comparing with the at least one image for a calibration of the optical combiner (as discussed later). The reference images belonging to the first set are captured while the at least one light pattern is being projected onto the semi-reflective surface of the optical combiner. The first set of reference images may comprise a single reference image or a plurality of reference images.

Optionally, when extracting features from a given image, the at least one processor is configured to employ at least one feature extraction algorithm. Examples of the features include, but are not limited to, edges, lines, corners, blobs and ridges. Examples of the at least one feature extraction algorithm include, but are not limited to: an edge-detection algorithm (for example, such as Canny edge detector, Deriche edge detector, and the like), a corner-detection algorithm (for example, such as Harris & Stephens corner detector, Shi-Tomasi corner detector, Features from Accelerated Segment Test (FAST) corner detector, and the like), a blob-detection algorithm (for example, such as Laplacian of Gaussian (LoG)-based blob detector, Difference of Gaussians (DoG)-based blob detector, Maximally Stable Extremal Regions (MSER) blob detector, and the like), a line-detection algorithm (for example, such as a standard Hough transform line detector, a probabilistic Hough transform line detector, an extended Hough transform line detector, a line segment detector (LSD) algorithm, and the like), a feature descriptor algorithm (for example, such as Binary Robust Independent Elementary Features (BRIEF), Gradient Location and Orientation Histogram (GLOH), Histogram of Oriented Gradients (HOG), and the like), and a feature detector algorithm (for example, such as Scale-Invariant Feature Transform (SIFT), Oriented FAST and rotated BRIEF (ORB), Speeded Up Robust Features (SURF), and the like). All the aforementioned feature extraction algorithms are well-known in the art. It will be appreciated that some of the aforesaid feature extraction algorithms, for example, such as the ORB, the SIFT, and the SURF, could be employed to extract (namely, identify) key point features from the given image, wherein said key point features are distinctive/salient features in the given image which may be served as reference points for enabling a robust and accurate feature matching between at least two images. This may, for example, be beneficial for performing an image processing operation such as an image stitching operation, an object recognition operation, and the like. Hereinabove, the term "given image" encompasses at least one of: a given reference image, the at least one image.

It will be appreciated that a given reference image not only represents a visual representation of the reflection of at least said part of the at least one light pattern off the at least one surface in the enclosed space, but may also represent a visual representation of the at least one object present in the enclosed space. It will also be appreciated that locations of object(s) with respect to the at least one tracking camera could be pre-known to the at least one processor. This is because the at least one tracking camera is fixedly arranged inside the enclosed space, and thus information pertaining to where said object(s) is/are located within the field-of-view of the at least one tracking camera can be pre-known, and the at least one processor could easily and accurately ascertain the first set of features by utilising the aforesaid information. The aforesaid information may be available from a data repository coupled to the at least one processor. Additionally, visual information pertaining to said object(s) could also be pre-known to the at least one processor in detail (for example, such as when said visual information would be available in a form of individual images of each of object present in the enclosed space, from the data repository). In this regard, the at least one processor could utilise said visual information to select only those features from amongst the extracted features that pertain to (namely, relevant to or relate to) the at least one object having the at least one surface, by employing at least one feature matching technique. Feature matching techniques are well-known in the art. As an example, when the enclosed space is the cabin of the vehicle, features of said first set that pertain to the at least one object may be edges and corners of a headrest of a seat of the vehicle.

Since the given reference image is captured by the at least one tracking camera itself, a position of each feature belonging to the first set and a position of the reference reflection (with respect to the at least one tracking camera) are already known and accurately known to the at least one processor, for example, from pixel coordinates of pixels in the given reference image. Thus, the first relative position of the reference reflection could be easily determined by the at least one processor, for example, by employing at least one coordinate geometry-based technique. Optionally, the first relative position of the reference reflection is represented in a given coordinate space. As an example, the given coordinate space may be a two-dimensional (2D) or a three-dimensional (3D) Cartesian coordinate space.

The term "reference reflection" refers to an initial reflection of at least said part of the at least one light pattern off the at least one surface of the at least one object. It will be appreciated that since the reference images representing the reference reflection are captured in the initial condition, the first relative position of the reference reflection could be served as a basis (namely, a reference) for comparing with the second relative position of said reflection in order to determine the change in the at least one of: the position, the orientation, the curvature, of the optical combiner. This is because the at least one image can be understood to be captured by the at least one tracking camera in a real-world condition. Such a real-world condition could, for example, be when the enclosed space is being used, and over a period of time, the optical combiner (namely, the windshield) is likely exposed to the at least one of: the wear and tear, the positional drift, the rotational drift. For such a real-world condition, the at least one image can be understood to be captured at a post-manufacturing step, and it may be likely that said reflection in the at least one image may appear to be shifted upward or downward based on a tilt of the optical combiner with respect to a horizontal axis, or may appear to be shifted leftward or rightward based on a misalignment of the optical combiner with respect to a vertical axis, as compared to the reference reflection in the given reference image. Therefore, it can be inferred that the first relative position of the reference reflection is more accurate and realistic, as compared to the second relative position of said reflection. Beneficially, the first relative position could be conveniently served as the basis for comparing with the second relative position in order to determine the aforesaid change accordingly. It will be appreciated that the at least one processor may utilise a mathematical function (such as a polynomial function) for determining the aforesaid change, based on the aforesaid difference. Advantageously, when the at least one processor has a knowledge pertaining to the change in the at least one of: the position, the orientation, the curvature, of the optical combiner, any geometrical aberrations arising due to said change could be easily corrected (namely, compensated), for example, when generating the input for producing a synthetic light field presenting virtual content (as discussed later in detail). This may potentially enhance an overall viewing experience of the given user, for example, in terms of realism and immersiveness, when the virtual content is shown to the given user by way of producing the synthetic light field. In addition to this, the optical combiner may also be calibrated by the at least one processor, based on the change in the at least one of: the position, the orientation, the curvature, of the optical combiner.

The features are extracted from the at least one image in a similar manner as discussed earlier. It will be appreciated that since the first set of features and the locations of the object(s) are already accurately known, the at least one processor could easily and accurately ascertain the second set of features, for example, by employing at least one feature matching technique to select only those features from amongst the extracted features that pertain to the at least one object and that match with at least the subset of the first set of features. It is to be understood that there may be a scenario when the at least one image and the set of reference images are captured from slightly different perspectives. In such a scenario, only some of the features of the second set may match with features belonging to the subset of the first set of features, while remaining features of the second set may be unique and may not match with any other features of the first set of features. It will be appreciated that the at least one processor is optionally configured to trim the second set of features to include only those features in the second set that are clearly visible (namely, well-represented) in both the at least one image and the reference images. This may potentially improve an accuracy of determining the change in the at least one of: the position, the orientation, the curvature of the optical combiner.

Since the at least one image is captured by the at least one tracking camera itself, a position of each feature belonging to the second set and a position of said reflection (with respect to the at least one tracking camera) are already accurately known to the at least one processor, for example, from pixel coordinates of pixels in the at least one image. Thus, the second relative position of said reflection could be easily determined by the at least one processor, for example, by employing at least one coordinate geometry-based technique. Optionally, the second relative position of said reflection is represented in the given coordinate space.

In an embodiment, the enclosed space is a cabin of a vehicle, the system further comprising at least one sensor employed to detect a setting of at least one adjustable seat parameter of at least one seat of the vehicle, wherein the at least one processor is configured to:

detect, using the at least one sensor, settings of the at least one adjustable seat parameter of the at least one seat, when capturing a plurality of sets of reference images, the plurality of sets of reference images comprising the first set of reference images and at least one other set of reference images;

classify the plurality of sets of reference images based on different settings of the at least one adjustable seat parameter;

detect, using the at least one sensor, a given setting of the at least one adjustable seat parameter of the at least one seat, when capturing the at least one image; and select the first set of reference images from amongst the plurality of sets of reference images, based on a match between the given setting of the at least one adjustable seat parameter when the at least one image is captured and a setting of the at least one adjustable seat parameter when the first set of reference images was captured.

In this regard, the term "sensor" refers to equipment that is operable to detect (namely, sense) a setting of a given adjustable seat parameter of a given seat of the vehicle. The given seat could be at least one of: at least one front seat, at least one back seat, of the vehicle. The at least one sensor is optionally communicably coupled to the at least one processor. The term "adjustable seat parameter" refers to a characteristic of the given seat (or its part) that can be modified to accommodate different preferences or requirements of a given user sitting on the given seat of the vehicle. It is to be understood that seat parameters are typically designed to be adjustable (namely, customizable) for allowing the given user to tailor a seat configuration according to his/her need for comfort and ergonomics. Furthermore, the term "setting" of a given adjustable seat parameter refers to a current state of the characteristic of the given seat (or its part). Optionally, a setting of the given adjustable seat parameter is represented in the given coordinate space. Optionally, the at least one adjustable seat parameter comprises at least one of: a position of the seat, an orientation of a backrest of the seat, a height of a lower part of the seat from a floor of the vehicle, an orientation of the lower part of the seat, a position of a headrest (namely, a neck support) of the seat, an orientation of the headrest, a curvature of a lumbar support of the seat. Optionally, the at least one sensor comprises at least one camera, wherein the at least one processor is configured to process at least one image captured by the at least one camera, to determine the setting of the given adjustable seat parameter. Optionally, when processing the at least one image, the at least one processor is configured to: extract a plurality of features from the at least one image; identify the given seat, based on the plurality of features; and determine the setting of the given adjustable seat parameter for the given identified seat by utilising a pre-known 3D model of the given seat.

It will be appreciated that different sets of reference images are captured for different settings of the at least one adjustable seat parameter of the at least one seat. It is to be understood that the different setting of the at least one adjustable seat parameter are detected at a same time when the different sets of reference images are captured (for example, such as at the factory manufacturing step). The at least one other set of reference images could, for example, be a second set of reference images, a third set of reference images, and so on. Since the at least one processor already has a knowledge of which sets of reference images correspond to which settings of the at least one adjustable seat parameter, a classification of the plurality of sets of reference images could be easily performed. In an example, for a given adjustable seat parameter P, a set X1 of reference images is captured when the given adjustable seat parameter P has a setting S1; a set X2 of reference images is captured when the given adjustable seat parameter P has a setting S2; a set X3 of reference images is captured when the given adjustable seat parameter P has a setting S3; and so on.

Further, in a real-world scenario, when the enclosed space is being used, the given setting of the at least one adjustable seat parameter is detected when capturing the at least one image. It will be appreciated that when the given setting matches with the setting of the at least one adjustable seat parameter when the first set of reference images was captured, it means that the at least one image and the reference images of the first set are captured for a same setting of the at least one adjustable parameter. Referring to and continuing with the aforesaid example, a given setting of the given adjustable parameter P may be S3, which matches with the setting with which the set X3 of reference images was captured. Thus, the set X3 of reference images would be selected as the first set of reference images.

The technical benefit of selecting the first set of reference images in the aforesaid manner is that it enables in improving an accuracy of selecting the second set of features that pertain to the at least one object having the at least one surface and that match with at least said subset of the first set of features, wherein the first set of features pertains to the at least one seat of the vehicle also. This is because when the at least one image and the reference images of the first set are captured corresponding to the same setting of the at least one adjustable parameter, visual information represented in both the at least one image and the reference images is considerably consistent, for example, in terms of a minimal variability in lighting, a viewing perspective, and other factors that could affect an appearance of a same feature in both the aforesaid images. Thus, matching features between such images captured at the same setting enables more accurate agreement between said features, because features that are visible and easily identifiable in one image captured under a specific setting are more likely to be present and identifiable in another image captured under the same specific setting. This significantly improves an accuracy of feature matching between the at least one image and the reference images, resulting into more reliable results. It will be appreciated that all steps of the aforementioned embodiment could be performed when there is at least one user present inside the enclosed space.

In an alternative or additional embodiment, the system further comprises at least one temperature sensor, wherein the at least one processor is configured to:

determine, using the at least one temperature sensor, ambient temperatures inside the enclosed space, when capturing a plurality of sets of reference images, the plurality of sets of reference images comprising the first set of reference images and at least one other set of reference images;

classify the plurality of sets of reference images based on different ranges of ambient temperatures;

determine, using the at least one temperature sensor, a given ambient temperature inside the enclosed space, when capturing the at least one image; and select the first set of reference images from amongst the plurality of sets of reference images, based on a match between the given ambient temperature when the at least one image is captured and a range of ambient temperatures when the first set of reference images was captured.

Optionally, the at least one temperature sensor is implemented as any one of: an infrared-based temperature sensor, a thermistor, a resistance temperature detector (RTD). The aforesaid temperature sensors and their working are well-known in the art. It will be appreciated that the at least one temperature sensor is optionally arranged inside the enclosed space for determining the given ambient temperature. The at least one temperature sensor is optionally communicably coupled to the at least one processor. The at least one temperature sensor may comprise a plurality of temperature sensors.

It will be appreciated that different sets of reference images are captured for different ambient temperatures determined inside the enclosed space. Since the at least one processor already has a knowledge of which sets of reference images correspond to which ambient temperatures, and a knowledge of the different ranges of ambient temperatures, a classification of the plurality of sets of reference images could be easily performed. In an example, a first range of ambient temperatures may lie from 0 to 10 degrees Celsius. A second range of ambient temperatures may lie from 10 to 20 degrees Celsius. A third range of ambient temperatures may lie from 20 to 30 degrees Celsius. A fourth range of ambient temperatures may lie from 30 to 40 degrees Celsius. In some scenarios, for example, when the enclosed space is the cabin of the vehicle, it may be noted that extreme temperatures (for example, such as greater than or equal to 50 degrees Celsius) would be experienced only at a time of starting the vehicle, for approximately 20 minutes from the time of starting the vehicle. This is because air conditioning inside the vehicle is typically used to maintain a user's preferred temperature range inside the vehicle. Information pertaining to the different ranges of ambient temperatures may be pre-stored at the data repository. Further, in a real-world scenario, when the enclosed space is being used, the given ambient temperature is determined when capturing the at least one image. It will be appreciated that when the given ambient temperature corresponding to the at least one image matches with (namely, lies within) the range of ambient temperatures corresponding to the first set of reference images, it means that the at least one image and the reference images of the first set are captured at a similar ambient temperature.

The technical benefit of selecting the first set of reference images in the aforesaid manner is that it enables in improving an accuracy of selecting the second set of features that pertain to the at least one object having the at least one surface and that match with at least said subset of the first set of features. This is because when the at least one image and the reference images of the first set are captured at a similar ambient temperature, visual information represented in both the at least one image and the reference images is considerably consistent, for example, in terms of a minimal variability in white balance, colour balance, and optionally, a viewing perspective, and other factors that could affect an appearance of a same feature in both the aforesaid images. Moreover, a thermal expansion of part(s)/objects(s) in the enclosed space would also be similar/consistent for the similar ambient temperature. Thus, matching features between such images captured at the similar ambient temperature enables more accurate agreement between said features, because features that are visible and identifiable in one image captured at a given ambient temperature are more likely to be present and easily identifiable in another image captured under a similar ambient temperature. This may significantly improve an accuracy of feature matching between the at least one image and the reference images, resulting into more reliable results. It will be appreciated that all steps of the aforementioned embodiment could be performed when there is at least one user present inside the enclosed space.

Optionally, the system further comprises the light field display unit, wherein the at least one processor is configured to:
  extract features from the at least one image;
  select, from amongst the features extracted from the at least one image, a set of features that pertain to at least one object that has the at least one surface off which at least said part of the at least one light pattern is reflected to generate said reflection;
  determine a relative position of said reflection with respect to positions of the features of said set;
  utilise the at least one tracking camera to determine a relative position of a first eye and of a second eye of at least one user with respect to the optical combiner;
  generate an input to be employed at the light field display unit for producing a synthetic light field, based on the relative position of the first eye and of the second eye of the at least one user with respect to the optical combiner, and the relative position of said reflection with respect to positions of the features of said set; and
  employ the input at the light field display unit to produce the synthetic light field presenting virtual content, wherein the optical combiner is employed to reflect a first part and a second part of the synthetic light field towards the first eye and the second eye of the at least one user, respectively, whilst optically combining the first part and the second part of the synthetic light field with the real-world light field.

In this regard, the features are extracted from the at least one image in a similar manner as discussed earlier. As discussed earlier, since the locations of the object(s) with respect to the at least one tracking camera and the visual information pertaining to said object(s) could be pre-known to the at least one processor, the at least one processor could easily select only those features from amongst the extracted features that pertain to (namely, relevant to or relate to) the at least one object having the at least one surface (for example, a headrest of a seat of a car). Moreover, since the at least one image is captured by the at least one tracking camera itself, a position of each feature belonging to said set and a position of said reflection (with respect to the at least one tracking camera) are already accurately known to the at least one processor, for example, from pixel coordinates of pixels in the at least one image. Thus, the relative position of said reflection could be easily determined by the at least one processor, for example, by employing at least one coordinate geometry-based technique. Optionally, the relative position of said reflection is represented in the given coordinate space. It will be appreciated that the aforementioned steps of extracting the features, selecting the set of features, and determining the relative position, are performed when there is no user inside the enclosed space.

Optionally, the at least one tracking camera is utilised for tracking a position of the first eye and the second eye of the at least one user, wherein the at least one user is present inside the enclosed space. It will be appreciated that for performing the aforesaid tracking, the at least one tracking camera capture images inside the enclosed space. For determining the relative location, the at least one tracking camera detects and/or follows a location of the first eye and of the second eye of the at least one user. The first eye could be one of a left eye of the at least one user and a right eye of the at least one user, whereas the second eye could be another of the left eye and the right eye. It will be appreciated that irrespective of where the at least one tracking camera is arranged, a relative location of the at least one tracking camera with respect to the optical combiner is fixed, and is pre-known to the at least one processor. This enables to determine the relative location of the first eye and of the second eye with respect to the optical combiner. Optionally, in this regard, when the at least one tracking camera is utilised to detect and/or follow the location of the first eye and of the second eye, a location of the first eye and of the second eye with respect to the at least one tracking camera is accurately known to the at least one processor, from tracking data collected by the at least one tracking camera. Thus, the at least one processor can easily and accurately determine the relative location of the first eye and of the second eye with respect to the optical combiner, based on the relative location of the at least one tracking camera with respect to the optical combiner and the location of the first eye and of the second eye with respect to the at least one tracking camera. Optionally, the relative location of the first eye and of the second eye is represented in the given coordinate space.

Furthermore, optionally, the at least one tracking camera repeatedly tracks the location of both eyes of the at least one user throughout a given session of using the system. In such a case, the at least one processor is configured to repeatedly determine the relative location of the first eye and of the second eye with respect to the optical combiner (in real time or near-real time). Beneficially, this potentially allows for presenting the at least one user with an augmented view of the synthetic light field with the real-world light field in an autostereoscopic manner. It is to be understood that when a plurality of users are present inside the enclosed space (for example, in a scenario where the enclosed space is in the form of the cabin of the vehicle, and more than one user is present inside the cabin of the vehicle), the at least one processor is configured to determine relative locations of both eyes of each user in a same manner as discussed hereinabove. Moreover, the relative location of the first eye and of the second eye is determined with respect to the optical combiner, because the synthetic light field (that is being produced by the light field display unit) would be presented to the at least one user via the optical combiner only.

The input employed by the light field display unit can be in various different forms, depending on a type of the light field display unit that is implemented (as discussed earlier). As a first example, in case of a hogel-based light field display unit or a lenticular array-based light field display unit or a parallax barrier-based light field display unit, the input can be in a form of a light field image comprising a plurality of pixels. As a second example, in case of a hologram-projector based light field display unit, the input is in a form of a holographic recording having a holographic interference pattern. As a third example, in case of a scanning-laser based light field display unit, the input can be in a form of any one of: image data, vector graphics, vector paths. As a fourth example, in case of a cathode ray tube (CRT)-like light field display unit, the input is in a form of a video signal comprising analog electrical signals. All the aforementioned forms of light field display units and their corresponding inputs are well-known in the art.

In a case when the input is in the form of the light field image comprising the plurality of pixels, a first set of pixels from amongst the plurality of pixels is responsible for generating the first part of the synthetic light field that corresponds to the first eye, and a second set of pixels from amongst the plurality of pixels is responsible for generating the second part of the synthetic light field that corresponds to the second eye. Upon reflection of the first part and the second part of the synthetic light field from the optical combiner, visual information corresponding to the first set of pixels and the second set of pixels of the light field image is perceived by the first eye and the second eye, respectively, as a first virtual image and a second virtual image. It will be appreciated that the pixels belonging to the first set are not arranged in a continuous manner across the light field image (namely, the input); similarly, the pixels belonging to the second set are also not arranged in a continuous manner across the light field image. It will also be appreciated that if the optical combiner (as well as a light-emitting surface of the light field display unit) were not curved, the pixels belonging to the first set and the pixels belonging to the second set would be arranged in alternating vertical stripes across a horizontal field of view of the light field image, wherein each vertical stripe comprises one or more scanlines of pixels. This is because humans perceive depth mainly based on horizontal binocular parallax. Notably, the light field image is considerably different from a regular 2D image that is displayed via a regular 2D display unit, because the (single) light field image comprises visual information corresponding to the first eye as well as the second eye of the at least one user. However, when the optical combiner is curved (irrespective of whether or not the light-emitting surface of the light field display unit is curved), the light field is generated in such a manner that it is distortion corrected; in this regard, the light field image is distortion corrected prior to being displayed. Consequently, the alternating stripes in which the pixels of the first set and the pixels of the second set are arranged would no more be simple vertical stripes. In other words, the stripes in which the pixels of the first set and the pixels of the second set are arranged would be in a deformed shape, rather than being straight vertical stripes. How much deformed a particular part of a stripe of pixels would be depends on an extent of curvature of a portion of the optical combiner that is employed to reflect light corresponding to that particular part of the stripe of pixels.

In this way, the light field display unit is not used for a calibration process itself; instead, the synthetic light field is produced to compensate for the curvature of the optical combiner, as well as any change in the position and/or the orientation of the optical combiner (for example, in a case where an old optical combiner is to be replaced by a new optical combiner). It will be appreciated that when the input is generated based on the relative position of said reflection with respect to the positions of the features of said set (for example, the headrest of the car seat), it is ensured that the synthetic light field is produced to compensate for the curvature of the combiner. Advantageously, this enables in accurately and realistically presenting the virtual content to each eye of the at least one user, wherein the at least one user is present inside the enclosed space.

In some implementations, the virtual content presented by the synthetic light field corresponds to at least one virtual object. Optionally, in this regard, the at least one processor is configured to generate the input from a perspective of the relative location of the first eye and of the second eye of the at least one user and by also taking into account the relative position of said reflection with respect to positions of the features of said set, by employing a 3D model of the at least one virtual object. The term "virtual object" refers to a computer-generated object (namely, a digital object). Examples of the at least one virtual object may include, but are not limited to, a virtual navigation tool, a virtual gadget, a virtual message, a virtual entity, a virtual entertainment media, a virtual vehicle or part thereof, and a virtual information. The term "three-dimensional model of a virtual object" refers to a data structure that comprises comprehensive information pertaining to the virtual object. Such a comprehensive information is indicative of at least one of: a plurality of features of the at least one virtual object or its portion, a shape and a size of the at least one virtual object or its portion, a pose of the at least one virtual object or its portion, a material of the at least one virtual object or its portion, a colour and an optical depth of the at least one virtual object or its portion. The 3D model of the at least one virtual object may be generated in the form of a 3D polygonal mesh, a 3D point cloud, a 3D surface cloud, a voxel-based model, or similar. Optionally, the 3D model of the at least one virtual object is generated in the given coordinate space. Optionally, the at least one processor is configured to store the 3D model of the at least one virtual object at the data repository.

It will be appreciated that when the optical combiner reflects the first part and the second part of the synthetic light field towards the first eye and the second eye, respectively, it means that light produced by a first part of the input, generating the first part of the synthetic light field, is directed towards the first eye upon reflecting off the optical combiner. Simultaneously, light produced by a second part of the input, generating the second part of the synthetic light field, is directed towards the second eye upon reflecting off the optical combiner. Therefore, upon said reflection of the first part and the second part of the synthetic light field, visual information corresponding to the first part of the input and the second part of the input is perceived by the first eye and the second eye, respectively. It is to be understood that due to binocular disparity, visual information for the first eye and visual information for the second eye would be slightly offset from each other. Beneficially, this enables in perceiving depth, when the virtual content is presented to the at least one user using the synthetic light field. The binocular disparity is well-known in the art. Additionally, when the first part and the second part of the synthetic light field are optically combined with the real-world light field, the virtual content is perceived by the left eye and the right eye, along with the visual information pertaining to the real-world objects present in the real-world environment. Advantageously, this provides a result that is similar to displaying a combined view of a virtual image augmenting a real-world image to the at least one user.

The present disclosure also relates to the method as described above. Various embodiments and variants disclosed above, with respect to the aforementioned first aspect, apply mutatis mutandis to the method.

Optionally, the method further comprises:
controlling the at least one tracking camera to capture a first set of reference images of the enclosed space, whilst controlling the at least one light source to project the at least one light pattern onto the semi-reflective surface of the optical combiner;
extracting features from the first set of reference images;
selecting, from amongst the features extracted from the first set of reference images, a first set of features that pertain to at least one object that has the at least one surface off which at least a part of the at least one light pattern is reflected to generate a reference reflection;
determining a first relative position of the reference reflection with respect to positions of the features of the first set;
extracting features from the at least one image of the enclosed space;
selecting, from amongst the features extracted from the at least one image, a second set of features that pertain to the at least one object that has the at least one surface off which at least said part of the at least one light pattern is reflected to generate said reflection and that match with at least a subset of the first set of features;
determining a second relative position of said reflection with respect to positions of the features of the second set; and
determining a change in at least one of: a position, an orientation, the curvature of the optical combiner, based on a difference between the first relative position of the reference reflection and the second relative position of said reflection.

Optionally, the method further comprises:
extracting features from the at least one image;
selecting, from amongst the features extracted from the at least one image, a set of features that pertain to at least one object that has the at least one surface off which at least said part of the at least one light pattern is reflected to generate said reflection;
determining a relative position of said reflection with respect to positions of the features of said set;
utilising the at least one tracking camera to determine a relative position of a first eye and of a second eye of at least one user with respect to the optical combiner;
generating an input to be employed at the light field display unit for producing a synthetic light field, based on the relative position of the first eye and of the second eye of the at least one user with respect to the optical combiner, and the relative position of said reflection with respect to positions of the features of said set; and
employing the input at the light field display unit to produce the synthetic light field presenting virtual content, wherein the optical combiner is employed to reflect a first part and a second part of the synthetic light field towards the first eye and the second eye of the at least one user, respectively, whilst optically combining the first part and the second part of the synthetic light field with the real-world light field.

Optionally, the method further comprises:
utilising at least one depth camera to generate a depth image of the enclosed space, wherein the at least one tracking camera comprises the at least one depth camera;
determining relative positions of different pattern features of the reflection with respect to the at least one tracking camera, based on optical depths of different portions of the at least one surface in the depth image; and
determining the curvature of the optical combiner, further based on the relative positions of the different pattern features of the reflection.

Optionally, the method further comprises:
controlling the at least one tracking camera to capture at least one other image of the enclosed space, whilst controlling an orientation of the at least one light source to project the at least one light pattern onto the at least one surface in the enclosed space;
detecting, in the at least one other image, another reflection of at least a part of the at least one light pattern off the at least one surface in the enclosed space, and determining a shape of the another reflection; and
determining the curvature of the optical combiner, further based on the shape of the another reflection.

Optionally, the enclosed space is a cabin of a vehicle, wherein the method further comprises:
  detecting, using at least one sensor, settings of at least one adjustable seat parameter of at least one seat of the vehicle, when capturing a plurality of sets of reference images, the plurality of sets of reference images comprising the first set of reference images and at least one other set of reference images;
  classifying the plurality of sets of reference images based on different settings of the at least one adjustable seat parameter;
  detecting, using the at least one sensor, a given setting of the at least one adjustable seat parameter of the at least one seat, when capturing the at least one image; and
  selecting the first set of reference images from amongst the plurality of sets of reference images, based on a match between the given setting of the at least one adjustable seat parameter when the at least one image is captured and a setting of the at least one adjustable seat parameter when the first set of reference images was captured.

Optionally, the method further comprises:
  determining, using at least one temperature sensor, ambient temperatures inside the enclosed space, when capturing a plurality of sets of reference images, the plurality of sets of reference images comprising the first set of reference images and at least one other set of reference images;
  classifying the plurality of sets of reference images based on different ranges of ambient temperatures;
  determining, using the at least one temperature sensor, a given ambient temperature inside the enclosed space, when capturing the at least one image; and
selecting the first set of reference images from amongst the plurality of sets of reference images, based on a match between the given ambient temperature when the at least one image is captured and a range of ambient temperatures when the first set of reference images was captured.

DETAILED DESCRIPTION OF THE DRAWINGS

Referring to FIG. 1, illustrated is a block diagram of an architecture of a system 100 for calibrating an optical combiner using structured light, in accordance with an embodiment of the present disclosure. With reference to FIG. 1, the system 100 comprises at least one light source (for example, depicted as a light source 102), at least one tracking camera (for example, depicted as a tracking camera 104), an optical combiner 106, and at least one processor (for example, depicted as a processor 108). Optionally, the tracking camera 104 comprises at least one depth camera (for example, depicted as a depth camera 110). Optionally, the system 100 further comprises a light field display unit 112, at least one sensor (for example, depicted as a sensor 114), and at least one temperature sensor (for example, depicted as a temperature sensor 116). The processor 108 is communicably coupled to the light source 102 and the tracking camera 104, and optionally, to the depth camera 110, the light field display unit 112, the sensor 114, and the temperature sensor 116. The processor 108 is configured to perform various operations, as described earlier with respect to the aforementioned first aspect.

It may be understood by a person skilled in the art that FIG. 1 includes a simplified architecture of the system 100, for sake of clarity, which should not unduly limit the scope of the claims herein. It is to be understood that the specific implementation of the system 100 is provided as an example and is not to be construed as limiting it to specific numbers or types of light sources, tracking cameras, optical combiners, processors, depth cameras, light field display units, sensors, temperature sensors. The person skilled in the art will recognize many variations, alternatives, and modifications of embodiments of the present disclosure.

Figure 2:
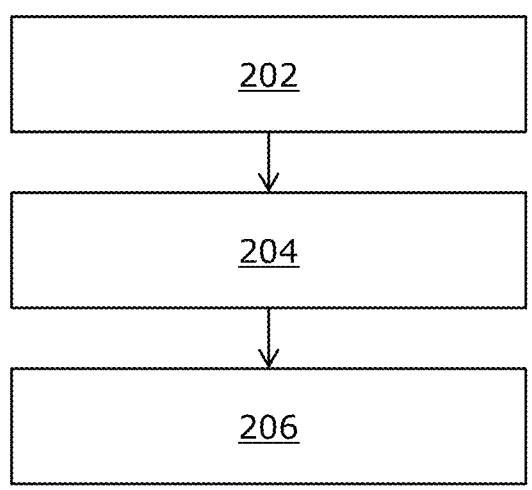
FIG. 2 illustrates steps of a method for calibrating an optical combiner using structured light, in accordance with an embodiment of the present disclosure.

Referring to FIG. 2, illustrated are steps of a method for calibrating an optical combiner using structured light, in accordance with an embodiment of the present disclosure. With reference to FIG. 2, at step 202, at least one tracking camera is controlled to capture at least one image of the enclosed space, whilst at least one light source is controlled to project at least one light pattern onto a semi-reflective surface of an optical combiner, wherein the optical combiner is arranged on an optical path of a light field display unit and on an optical path of a real-world light field of a real-world environment. At step 204, a reflection of at least a part of the at least one light pattern off at least one surface in the enclosed space, is detected in the at least one image, and a shape of said reflection is determined. At step 206, a curvature of the optical combiner is determined, based on a shape of at least said part of the at least one light pattern and the shape of the reflection of at least said part of the at least one light pattern.

The aforementioned steps are only illustrative and other alternatives can also be provided where one or more steps are added, one or more steps are removed, or one or more steps are provided in a different sequence without departing from the scope of the claims.

Figure 3A:
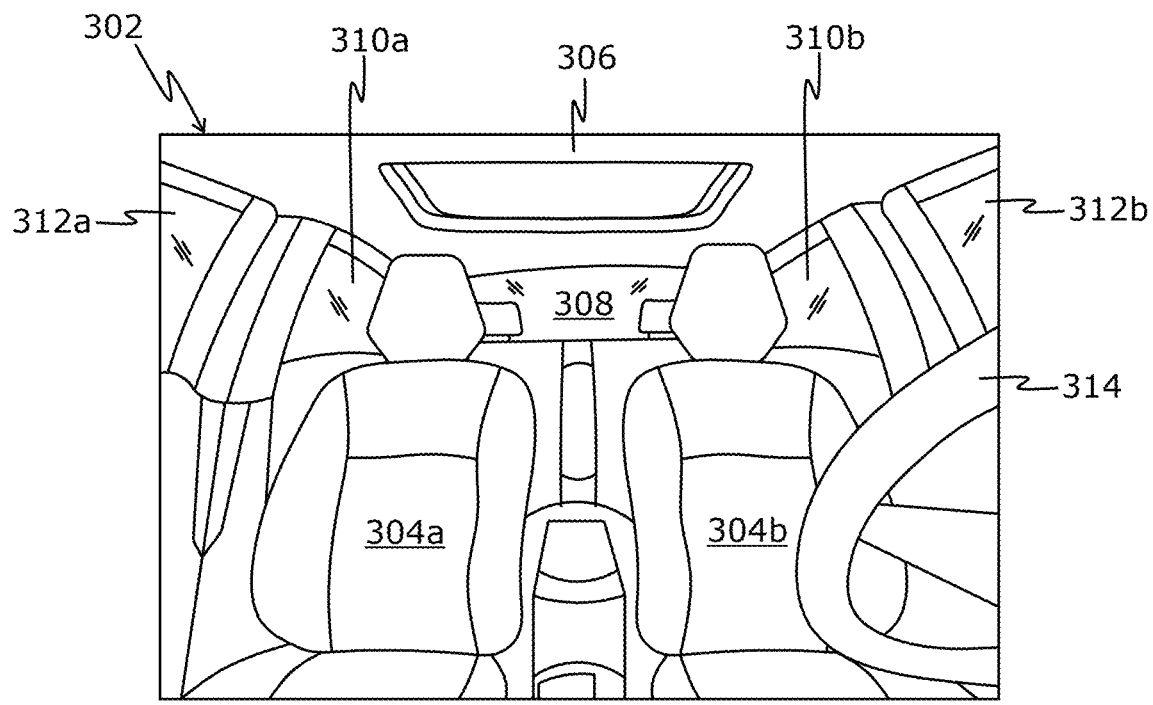
FIG. 3A is a simplified schematic illustration of an enclosed space.
Figure 3B:
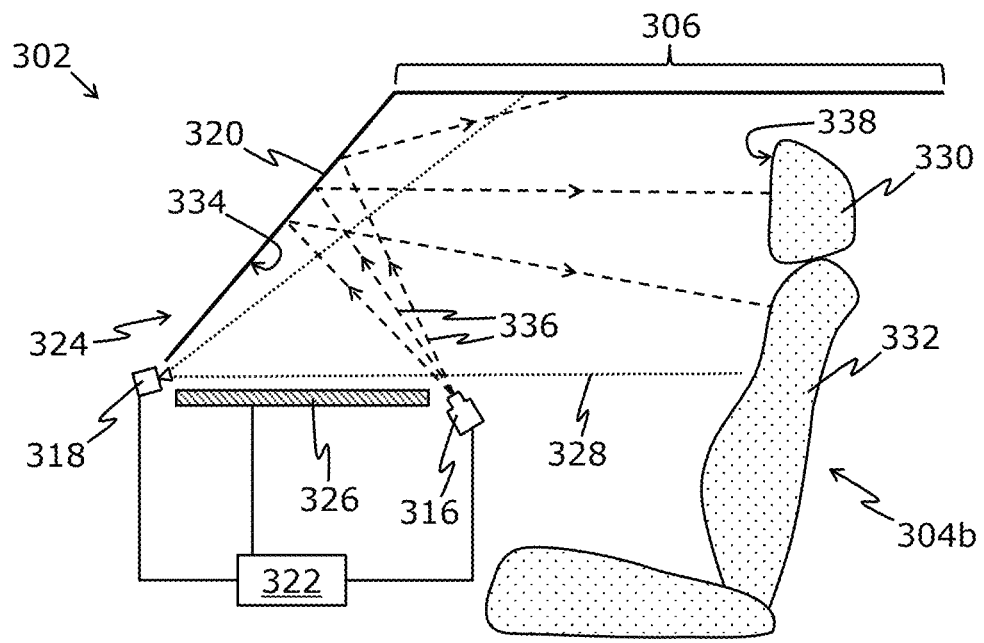
FIG. 3B illustrates an exemplary scenario of implementing a system for calibrating an optical combiner using structured light, in the enclosed space.
Figure 3C:
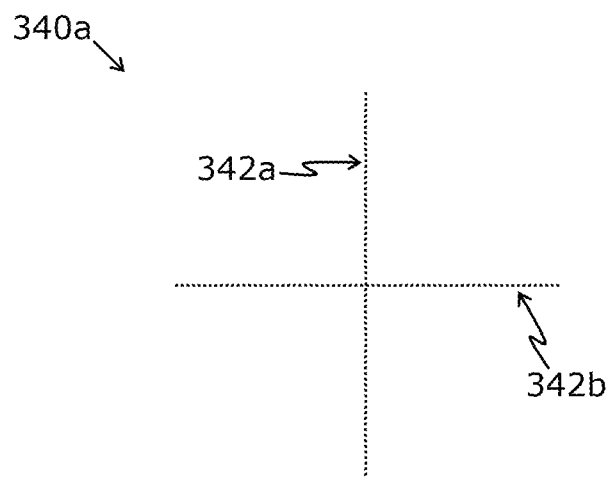
FIGS. 3C and 3D illustrate different exemplary light patterns projected onto a semi-reflective surface of the optical combiner, respectively.
Figure 3D:
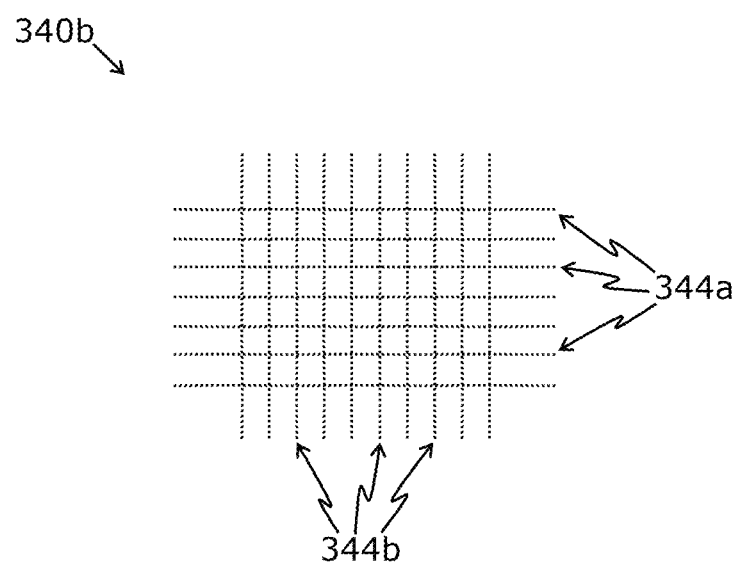
Figure 3E:
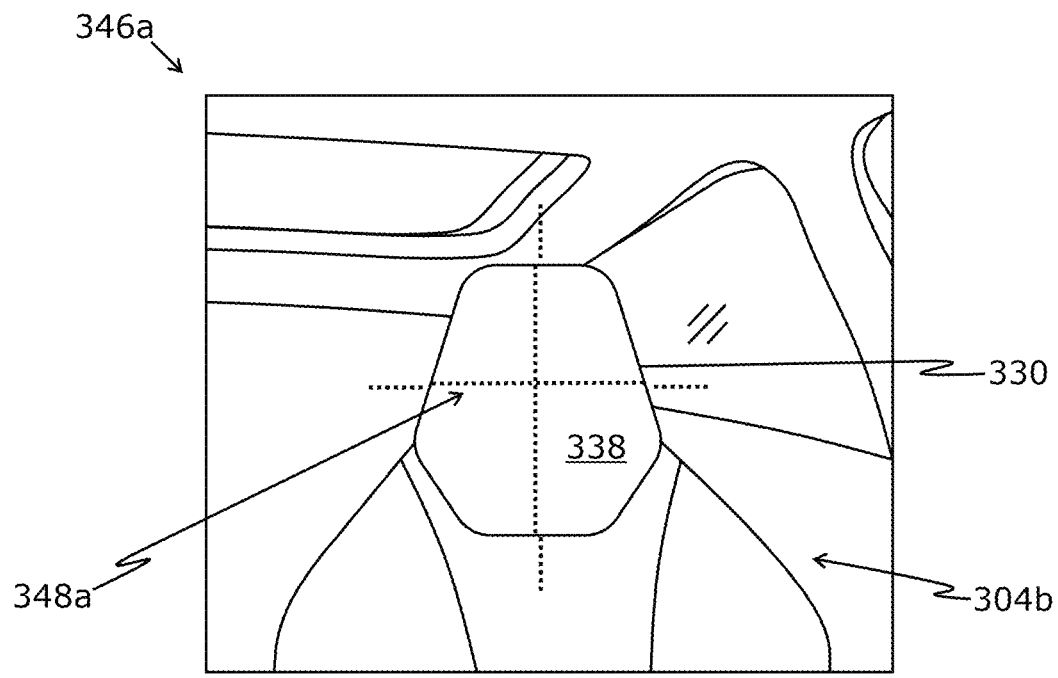
FIGS. 3E and 3I illustrate different examples of reference images captured whilst projecting the light patterns, respectively.
Figure 3F:
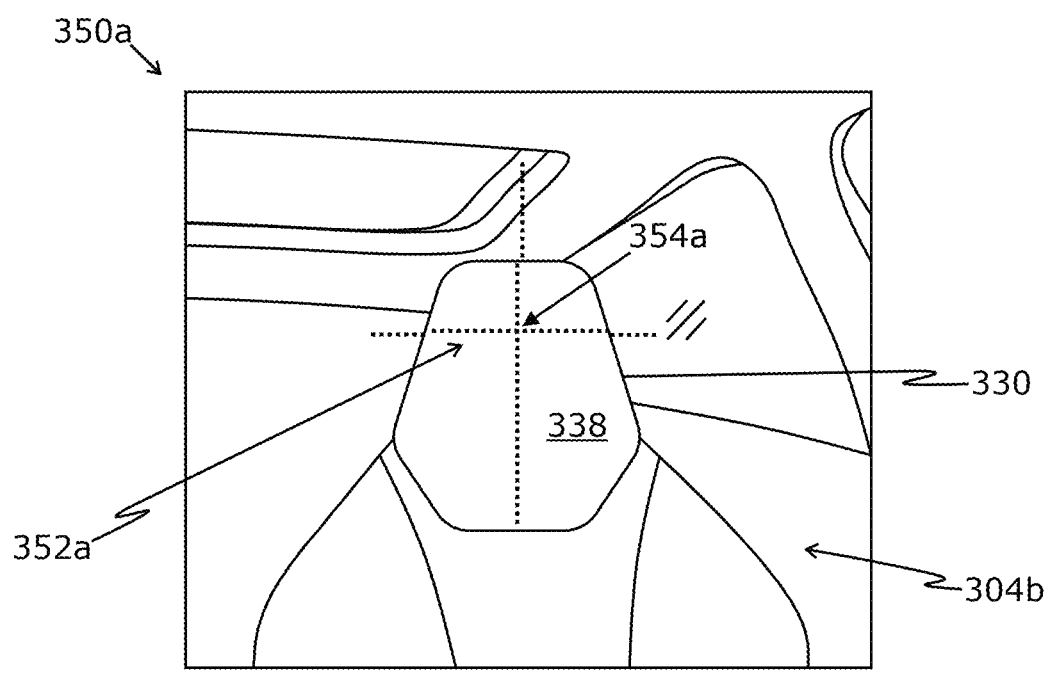
Figure 3G:
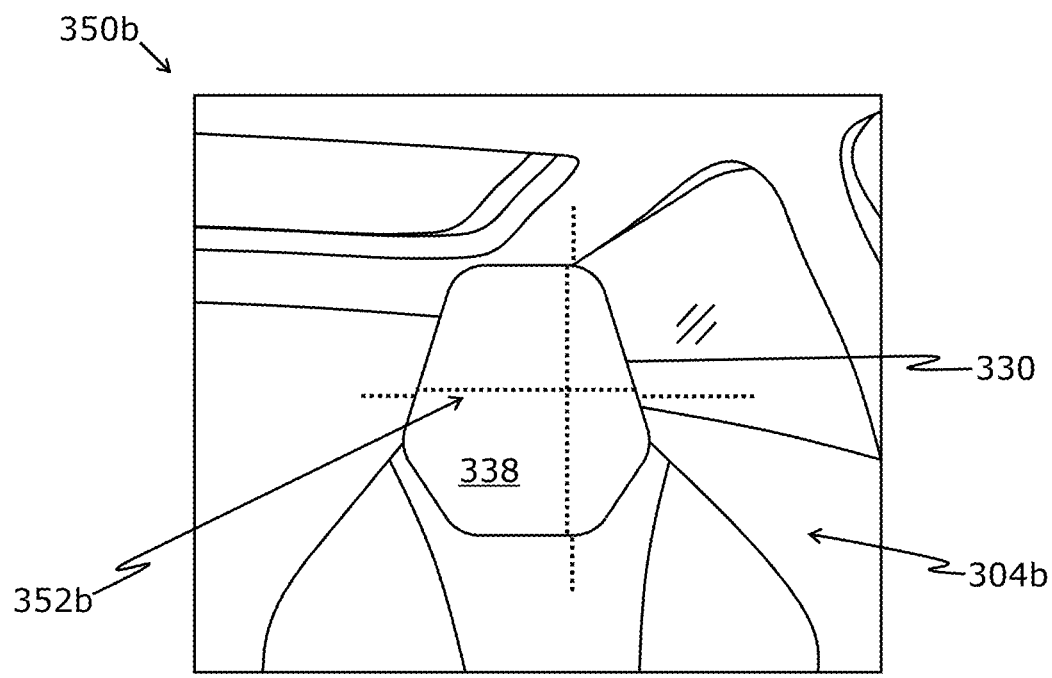
Figure 3H:
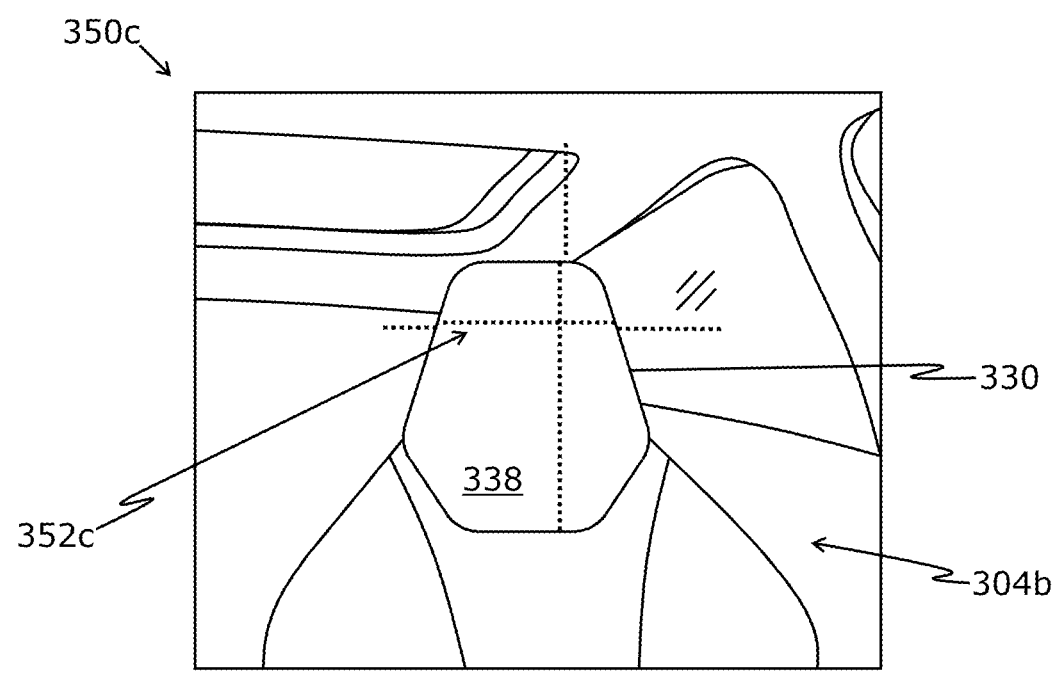
Figure 3I:
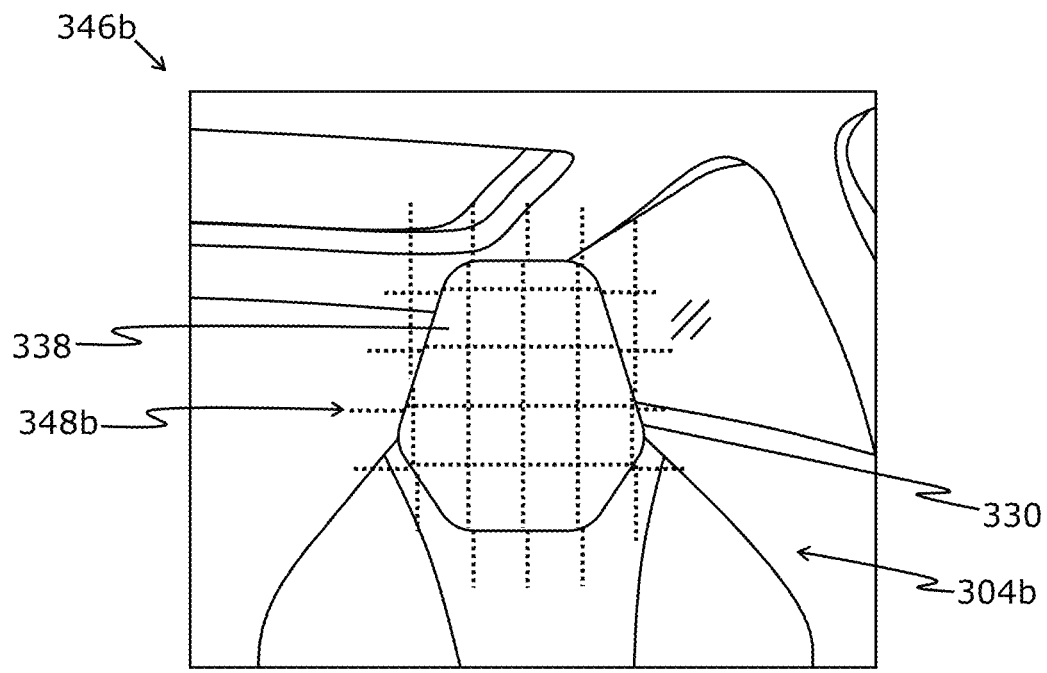
Figure 3J:
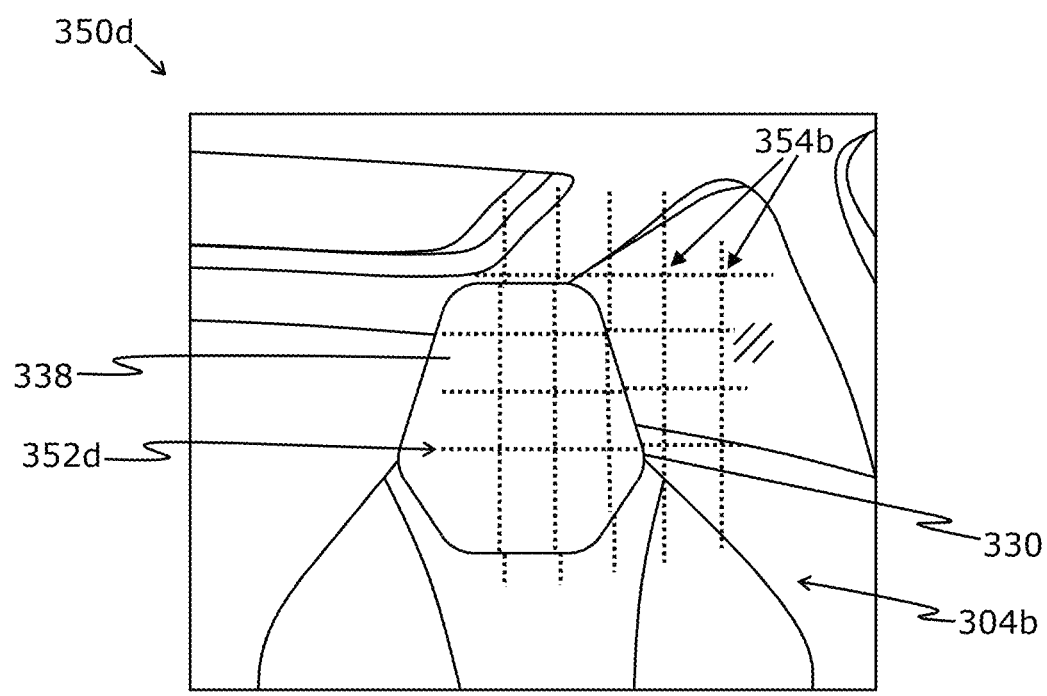
FIG. 3J illustrates an exemplary image captured whilst projecting the light pattern, in accordance with an embodiment of the present disclosure.

Referring to FIGS. 3A, 3B, 3C, 3D, 3E, 3F, 3G, 3H, 3I, and 3J, FIG. 3A is a simplified schematic illustration of an enclosed space 302. FIG. 3B illustrates an exemplary scenario of implementing a system for calibrating an optical combiner 320 using structured light, in the enclosed space 302. FIGS. 3C and 3D illustrate different exemplary light patterns 340a and 340b projected onto a semi-reflective surface 334 of the optical combiner 320, respectively. FIGS. 3E and 3I illustrate different examples of reference images 346a and 346b captured whilst projecting the light patterns 340a and 340b, respectively. FIGS. 3F, 3G, and 3H illustrate different exemplary images 350a, 350b, and 350c captured whilst projecting the light pattern 340a. FIG. 3J illustrates an exemplary image 350d captured whilst projecting the light pattern 340b, in accordance with an embodiment of the present disclosure.

With reference to FIG. 3A, the enclosed space 302 is shown as a cabin of a vehicle (for example, such as a car) comprising at least at least one seat (for example, depicted as two seats 304a and 304b), a ceiling 306, a rear windshield 308, rear windows 310a and 310b, front windows 312a and 312b, and a steering wheel 314. For illustration purposes only, FIG. 3A represents a view of the vehicle from a perspective of a dashboard (not shown) of the vehicle. For sake of simplicity and convenience, only some parts of the vehicle are shown and/or labelled in FIG. 3A.

With reference to FIG. 3B, for sake of simplicity and clarity, a simplified side view of the enclosed space 302 (namely, the cabin of the vehicle) is shown. The system comprises at least one light source (for example, depicted as a light source 316), at least one tracking camera (for example, depicted as a tracking camera 318), the optical combiner 320, and at least one processor (for example, depicted as a processor 322). When the enclosed space 302 is the cabin of the vehicle, a front windshield 324 of the vehicle is shown to be utilised as the optical combiner 320. The optical combiner 320 is arranged on an optical path of a light field display unit 326 and on an optical path of a real-world light field (not shown) of a real-world environment in which the vehicle is present. The processor 322 is shown to be communicably coupled to the light source 316, the tracking camera 318, and the light field display unit 326. The tracking camera 318 is shown to be arranged on a dashboard of the vehicle in a manner that the tracking camera 318 faces (an interior of) the cabin of the vehicle, for capturing a given image of the cabin of the vehicle (namely, the enclosed space 302). For sake of simplicity and clarity, a field of view 328 of the tracking camera 318 is depicted using two dotted lines that originate from a surface of the tracking camera 318. The field of view 328 of the tracking camera 318 includes a portion of the ceiling 306 of the vehicle, a headrest 330 of the seat 304b, and a portion of a backrest 332 of the seat 304b. The tracking camera 318 is controlled (by the processor 322) to capture the given image, whilst the light source 316 is controlled to project at least one light pattern (for example, such as a structured light pattern) onto a semi-reflective surface 334 of the optical combiner 320. For sake of simplicity, the at least one light pattern is not shown in FIG. 3B. Instead, a light 336 emitted by the light source 316 is shown in FIG. 3B, wherein said light 336 projects the at least one light pattern onto the semi-reflective surface 334. Examples of the at least one light pattern are shown and described later in FIGS. 3C and 3D. It is to be noted that the at least one light pattern (namely, the light 336) incidents upon at least one surface (for example, depicted as a surface 338 of the headrest 330) in the enclosed space 302 after being reflected by the semi-reflective surface 334 of the optical combiner 320. It will be appreciated that the at least one light pattern may also incident upon other surface(s) (for example, a surface of the backrest 332) in the enclosed space 302, upon said reflection.

With reference to FIG. 3C, the light pattern 340a is shown as a single crosshair-like light pattern comprising two perpendicular light lines 342a and 342b (depicted as two perpendicular dotted lines). With reference so to FIG. 3D, the light pattern 340b is shown as a grid of crosshair-like light patterns comprising multiple horizontal light lines 344a (depicted as horizontal dotted lines) of light and multiple vertical light lines 344b (depicted as vertical dotted lines) that are perpendicular to each other. It is to be noted that FIGS. 3C and 3D depict original forms (namely, original shape or structure) of the light patterns 340a-b, i.e., how the light patterns 340a-b look like prior to any projection/emission from the light source 316. Thus, the semi-reflective surface 334 of the optical combiner 320 onto which these light patterns 340a-b are to be projected, are not shown in FIGS. 3C and 3D.

With reference to FIG. 3E, the reference image 346a is captured by the tracking camera 318 while the light pattern 340a (as shown in FIG. 3C) is projected by the light source 316 onto the semi-reflective surface 334. The light pattern 340a incidents, for example, upon the surface 338 of the headrest 330 after being reflected by the semi-reflective surface 334. For sake of simplicity and clarity, the reference image 346a is shown to comprise a visual representation of a reference reflection 348a of the light pattern 340a off the surface 338, along with a visual representation of a portion of the enclosed space 302 (namely, the cabin of the vehicle).

With reference to FIG. 3I, the reference image 346b is captured by the tracking camera 318 while the light pattern 340b (as shown in FIG. 3D) is projected by the light source 316 onto the semi-reflective surface 334. The light pattern 340b incidents, for example, upon the surface 338 of the headrest 330 after being reflected by the semi-reflective surface 334. For sake of simplicity and clarity, the reference image 346b is shown to comprise a visual representation of a reference reflection 348b of the light pattern 340b off the surface 338, along with a visual representation of a portion of the enclosed space 302 (namely, the cabin of the vehicle).

It will be appreciated that the reference images 346a (as shown in FIG. 3E) and 346b (as shown in FIG. 3I) are captured by the tracking camera 318 in an initial condition. Such an initial condition could, for example, be when the enclosed space 302 is freshly manufactured, and the optical combiner 320 (namely, the front windshield 324) is not yet exposed to at least one of: wear and tear, a positional drift, a rotational drift, for example, such as due to a mechanical stress, a thermal stress, and the like. Thus, for such an initial condition, the reference images 346a and 346b are to be understood to be captured at a factory manufacturing step.

With reference to FIGS. 3F, 3G, and 3H, the images 350a, 350b, and 350c are captured by the tracking camera 318 while the light pattern 340a (as shown in FIG. 3C) is projected by the light source 316 onto the semi-reflective surface 334. The light pattern 340a incidents, for example, upon the surface 338 of the headrest 330 after being reflected by the semi-reflective surface 334. The images 350a, 350b, and 350c are captured by the tracking camera 318 in a real-world condition. Such a real-world condition could, for example, be when the enclosed space 302 is being used, and over a period of time, the optical combiner 320 (namely, the front windshield 324) is likely exposed to the at least one of: the wear and tear, the positional drift, the rotational drift. Thus, for such a real-world condition, the images 350a, 350b, and 350c are to be understood to be captured at a post-manufacturing step. For sake of simplicity and clarity, the images 350a, 350b, and 350c are shown to comprise visual representations of reflections 352a, 352b, and 352c of the light pattern 340a off the surface 338, respectively, along with a visual representation of a portion of the enclosed space 302 (namely, the cabin of the vehicle).

With reference to FIG. 3F, the reflection 352a is shown to be displaced in a vertically-upward direction, with respect to the reference reflection 348a as shown in FIG. 3E. The reflection 352a comprises a pattern feature 354a (shown as a point representing a junction of two perpendicular light lines of the single crosshair-like light pattern). For sake of simplicity and clarity, a pattern feature is only shown in FIG. 3F and FIG. 3J. With reference to FIG. 3G, the reflection 352b is shown to be displaced in a horizontally-rightward direction, with respect to the reference reflection 348a shown in FIG. 3E. With reference to FIG. 3H, the reflection 352c is shown to be displaced in both a vertically-upward direction as well as a horizontally-rightward direction, with respect to the reference reflection 348a shown in FIG. 3E. For illustration purposes and better understanding, an extent of displacement of the aforesaid reflections 352a, 352b, and 352c is shown to be exaggerated.

With reference to FIG. 3J, the image 350d is captured by the tracking camera 318 while the light pattern 340b as shown in FIG. 3D is projected by the light source 316 onto the semi-reflective surface 334. The light pattern 340b incidents, for example, upon the surface 338 of the headrest 330 after being reflected by the semi-reflective surface 334. The image 350d is captured by the tracking camera 318 in a real-world condition (as described hereinabove in detail). For sake of simplicity and clarity, the image 350d is shown to comprise visual representations of reflections 352d of the light pattern 340b off the surface 338, along with a visual representation of a portion of the enclosed space 302 (namely, the cabin of the vehicle). The reflection 352d is shown to be displaced in a diagonal-upward direction, with respect to the reference reflection 348b (as shown in FIG. 3I). The reflection 352d comprises a plurality of pattern features 354b (shown as points representing junctions of each of two perpendicular light lines). For illustration purposes and better understanding, an extent of displacement of the reflection 352d is shown to be exaggerated.

Figure 4:
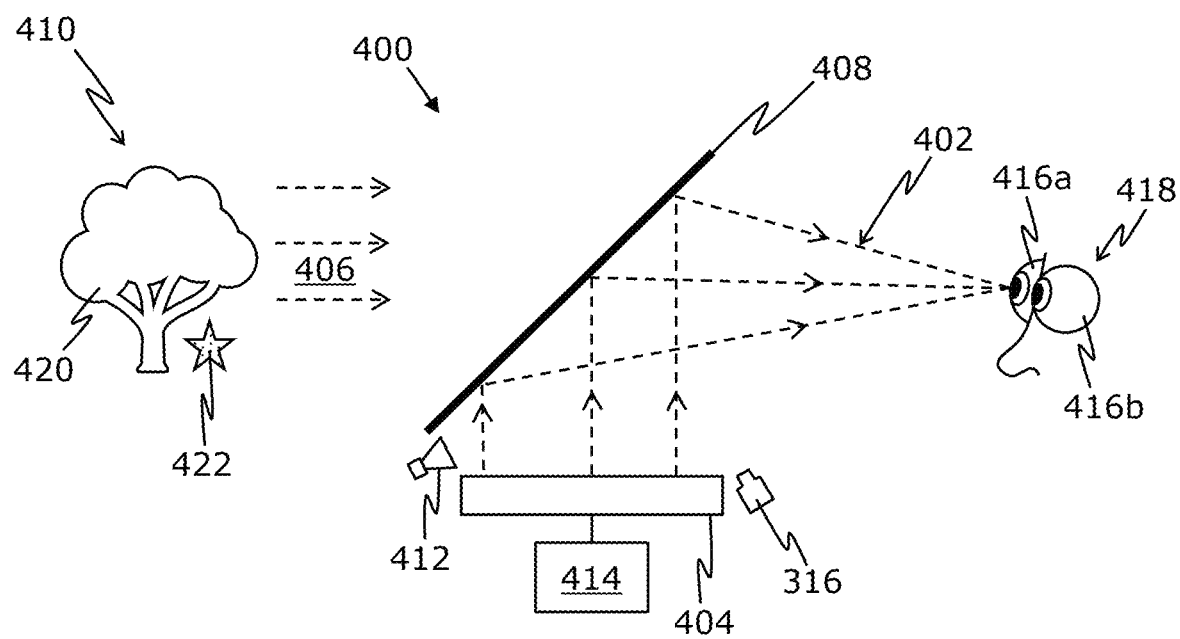
FIG. 4 illustrates an exemplary scenario in which a synthetic light field is produced using a light field display unit, and is optically combined with a real-world light field using an optical combiner, in accordance with an embodiment of the present disclosure.

Referring to FIG. 4, illustrated is an exemplary scenario 400 in which a synthetic light field 402 is produced using a light field display unit 404, and is optically combined with a real-world light field 406 using an optical combiner 408, in accordance with an embodiment of the present disclosure. With reference to FIG. 4, a real-world environment 410 is shown, where at least one tracking camera (for example, depicted as a tracking camera 412) is utilised by at least one processor (for example, depicted as a processor 414) to determine a relative position of a first eye 416a and of a second eye 416b of at least one user (depicted as a user 418) with respect to the optical combiner 408, the optical combiner 408 being arranged on an optical path of the light field display unit 404 and on an optical path of the real-world light field 406 of the real-world environment 410. In the real-world environment 410, there are one or more real-world objects, depicted as a real-world object 420 (shown as a tree). An input to be employed by the light field display unit 404 is generated by the processor 414, based on the relative position of the first eye 416a and of the second eye 416b of the user 418 with respect to the optical combiner 408, and a relative position of a reflection with respect to positions of features of a set, wherein said reflection is a reflection of at least a part of at least one light pattern off at least one surface in an enclosed space, and wherein said features of said set are selected, from amongst features extracted from at least one image of the enclosed space, and wherein said features of said set pertain to at least one object that has the at least one surface off which at least said part of the at least one light pattern is reflected to generate said reflection. The input is employed at the light field display unit 404 to produce the synthetic light field 402 presenting virtual content 422, for example, such as a virtual object (depicted as a star having a dotted pattern). For illustration purposes only, the virtual content 422 is shown to be presented at an optical depth that is (almost) same as an optical depth of the real-world object 420. The optical combiner 408 is employed to reflect a first part and a second part of the synthetic light field 402 towards the first eye 416a and the second eye 416b, respectively, whilst optically combining the first part and the second part of the synthetic light field 402 with the real-world light field 406.

FIGS. 3A, 3B, 3C, 3D, 3E, 3F, 3G, 3H, 3I, 3J, and 4 are merely examples, which should not unduly limit the scope of the claims herein. A person skilled in the art will recognize many variations, alternatives, and modifications of embodiments of the present disclosure.

The invention claimed is:

1. A system implemented in an enclosed space, the system comprising:
   at least one light source;
   at least one tracking camera;
   an optical combiner arranged on an optical path of a light field display unit and on an optical path of a real-world light field of a real-world environment; and
   at least one processor configured to:
   control the at least one tracking camera to capture at least one image of the enclosed space, whilst controlling the at least one light source to project at least one light pattern onto a semi-reflective surface of the optical combiner;
   detect, in the at least one image, a reflection of at least a part of the at least one light pattern off at least one surface in the enclosed space, and determine a shape of said reflection;
   determine a curvature of the optical combiner, based on a shape of at least said part of the at least one light pattern and the shape of the reflection of at least said part of the at least one light pattern;
   control the at least one tracking camera to capture a first set of reference images of the enclosed space, while controlling the at least one light source to project the at least one light pattern onto the semi-reflective surface of the optical combiner;
   extract features from the first set of reference images;
   select, from among the features extracted from the first set of reference images, a first set of features that pertain to at least one object that has the at least one surface off which at least a part of the at least one light pattern is reflected to generate a reference reflection;
   determine a first relative position of the reference reflection with respect to positions of the features of the first set;
   extract features from the at least one image of the enclosed space;
   select, from amongst the features extracted from the at least one image, a second set of features that pertain to the at least one object that has the at least one surface off which at least said part of the at least one light pattern is reflected to generate said reflection and that match with at least a subset of the first set of features;
   determine a second relative position of said reflection with respect to positions of the features of the second set; and
   determine a change in at least one of: a position, an orientation, the curvature of the optical combiner, based on a difference between the first relative position of the reference reflection and the second relative position of said reflection.

2. The system of claim 1, further comprising the light field display unit, wherein the at least one processor is configured to:
   extract features from the at least one image;
   select, from amongst the features extracted from the at least one image, a set of features that pertain to at least one object that has the at least one surface off which at least said part of the at least one light pattern is reflected to generate said reflection;
   determine a relative position of said reflection with respect to positions of the features of said set;
   utilise the at least one tracking camera to determine a relative position of a first eye and of a second eye of at least one user with respect to the optical combiner;
   generate an input to be employed at the light field display unit for producing a synthetic light field, based on the relative position of the first eye and of the second eye of the at least one user with respect to the optical combiner, and the relative position of said reflection with respect to positions of the features of said set; and
   employ the input at the light field display unit to produce the synthetic light field presenting virtual content, wherein the optical combiner is employed to reflect a first part and a second part of the synthetic light field towards the first eye and the second eye of the at least one user, respectively, whilst optically combining the first part and the second part of the synthetic light field with the real-world light field.

3. The system of claim 1, wherein the at least one tracking camera comprises at least one depth camera, wherein the at least one processor is configured to:
- utilise the at least one depth camera to generate a depth image of the enclosed space;
- determine relative positions of different pattern features of the reflection with respect to the at least one tracking camera, based on optical depths of different portions of the at least one surface in the depth image; and
- determine the curvature of the optical combiner, further based on the relative positions of the different pattern features of the reflection.

4. The system of claim 1, wherein the at least one processor is configured to:
- control the at least one tracking camera to capture at least one other image of the enclosed space, whilst controlling an orientation of the at least one light source to project the at least one light pattern onto the at least one surface in the enclosed space;
- detect, in the at least one other image, another reflection of at least a part of the at least one light pattern off the at least one surface in the enclosed space, and determine a shape of the another reflection; and
- determine the curvature of the optical combiner, further based on the shape of the another reflection.

5. The system of claim 1, wherein the enclosed space is a cabin of a vehicle, the system further comprising at least one sensor employed to detect a setting of at least one adjustable seat parameter of at least one seat of the vehicle, wherein the at least one processor is configured to:
- detect, using the at least one sensor, settings of the at least one adjustable seat parameter of the at least one seat, when capturing a plurality of sets of reference images, the plurality of sets of reference images comprising the first set of reference images and at least one other set of reference images;
- classify the plurality of sets of reference images based on different settings of the at least one adjustable seat parameter;
- detect, using the at least one sensor, a given setting of the at least one adjustable seat parameter of the at least one seat, when capturing the at least one image; and
- select the first set of reference images from amongst the plurality of sets of reference images, based on a match between the given setting of the at least one adjustable seat parameter when the at least one image is captured and a setting of the at least one adjustable seat parameter when the first set of reference images was captured.

6. The system of claim 1, further comprising at least one temperature sensor, wherein the at least one processor is configured to:
- determine, using the at least one temperature sensor, ambient temperatures inside the enclosed space, when capturing a plurality of sets of reference images, the plurality of sets of reference images comprising the first set of reference images and at least one other set of reference images;
- classify the plurality of sets of reference images based on different ranges of ambient temperatures;
- determine, using the at least one temperature sensor, a given ambient temperature inside the enclosed space, when capturing the at least one image; and
- select the first set of reference images from amongst the plurality of sets of reference images, based on a match between the given ambient temperature when the at least one image is captured and a range of ambient temperatures when the first set of reference images was captured.

7. A method implemented in an enclosed space, the method comprising:
- controlling at least one tracking camera to capture at least one image of an enclosed space, whilst controlling at least one light source to project at least one light pattern onto a semi-reflective surface of an optical combiner, wherein the optical combiner is arranged on an optical path of a light field display unit and on an optical path of a real-world light field of a real-world environment;
- detecting, in the at least one image, a reflection of at least a part of the at least one light pattern off at least one surface in the enclosed space, and determining a shape of said reflection;
- determining a curvature of the optical combiner, based on a shape of at least said part of the at least one light pattern and the shape of the reflection of at least said part of the at least one light pattern;
- controlling the at least one tracking camera to capture a first set of reference images of the enclosed space, while controlling the at least one light source to project the at least one light pattern onto the semi-reflective surface of the optical combiner;
- extracting features from the first set of reference images;
- selecting, from among the features extracted from the first set of reference images, a first set of features that pertain to at least one object that has the at least one surface off which at least a part of the at least one light pattern is reflected to generate a reference reflection;
- determining a first relative position of the reference reflection with respect to positions of the features of the first set;
- extracting features from the at least one image of the enclosed space;
- selecting, from amongst the features extracted from the at least one image, a second set of features that pertain to the at least one object that has the at least one surface off which at least said part of the at least one light pattern is reflected to generate said reflection and that match with at least a subset of the first set of features;
- determining a second relative position of said reflection with respect to positions of the features of the second set; and
- determining a change in at least one of: a position, an orientation, the curvature of the optical combiner, based on a difference between the first relative position of the reference reflection and the second relative position of said reflection.

8. The method of claim 7, further comprising:
extracting features from the at least one image;
selecting, from amongst the features extracted from the at least one image, a set of features that pertain to at least one object that has the at least one surface off which at least said part of the at least one light pattern is reflected to generate said reflection;
determining a relative position of said reflection with respect to positions of the features of said set;
utilising the at least one tracking camera to determine a relative position of a first eye and of a second eye of at least one user with respect to the optical combiner;
generating an input to be employed at the light field display unit for producing a synthetic light field, based on the relative position of the first eye and of the second eye of the at least one user with respect to the optical combiner, and the relative position of said reflection with respect to positions of the features of said set; and employing the input at the light field display unit to produce the synthetic light field presenting virtual content, wherein the optical combiner is employed to reflect a first part and a second part of the synthetic light field towards the first eye and the second eye of the at least one user, respectively, whilst optically combining the first part and the second part of the synthetic light field with the real-world light field.

9. The method of claim 7, further comprising:

utilising at least one depth camera to generate a depth image of the enclosed space, wherein the at least one tracking camera comprises the at least one depth camera;

determining relative positions of different pattern features of the reflection with respect to the at least one tracking camera, based on optical depths of different portions of the at least one surface in the depth image; and determining the curvature of the optical combiner, further based on the relative positions of the different pattern features of the reflection.

10. The method of claim 7, further comprising:

controlling the at least one tracking camera to capture at least one other image of the enclosed space, whilst controlling an orientation of the at least one light source to project the at least one light pattern onto the at least one surface in the enclosed space;

detecting, in the at least one other image, another reflection of at least a part of the at least one light pattern off the at least one surface in the enclosed space, and determining a shape of the another reflection; and determining the curvature of the optical combiner, further based on the shape of the another reflection.

11. The method of claim 10, wherein the enclosed space is a cabin of a vehicle, and wherein the method further comprises:

detecting, using at least one sensor, settings of at least one adjustable seat parameter of at least one seat of the vehicle, when capturing a plurality of sets of reference images, the plurality of sets of reference images comprising the first set of reference images and at least one other set of reference images;

classifying the plurality of sets of reference images based on different settings of the at least one adjustable seat parameter;

detecting, using the at least one sensor, a given setting of the at least one adjustable seat parameter of the at least one seat, when capturing the at least one image; and selecting the first set of reference images from amongst the plurality of sets of reference images, based on a match between the given setting of the at least one adjustable seat parameter when the at least one image is captured and a setting of the at least one adjustable seat parameter when the first set of reference images was captured.

12. The method of claim 7, further comprising:

determining, using at least one temperature sensor, ambient temperatures inside the enclosed space, when capturing a plurality of sets of reference images, the plurality of sets of reference images comprising the first set of reference images and at least one other set of reference images;

classifying the plurality of sets of reference images based on different ranges of ambient temperatures;

determining, using the at least one temperature sensor, a given ambient temperature inside the enclosed space, when capturing the at least one image; and selecting the first set of reference images from amongst the plurality of sets of reference images, based on a match between the given ambient temperature when the at least one image is captured and a range of ambient temperatures when the first set of reference images was captured.

* * * * *